US012238371B2

(12) United States Patent
Neumeier et al.

(10) Patent No.: US 12,238,371 B2
(45) Date of Patent: Feb. 25, 2025

(54) METHODS FOR IDENTIFYING VIDEO SEGMENTS AND DISPLAYING CONTEXTUALLY TARGETED CONTENT ON A CONNECTED TELEVISION

(71) Applicant: INSCAPE DATA, INC., Irvine, CA (US)

(72) Inventors: Zeev Neumeier, Berkeley, CA (US); Edo Liberty, Or-Yehuda (IL)

(73) Assignee: INSCAPE DATA, INC., Irvine, CA (US)

( * ) Notice: Subject to any disclaimer, the term of this patent is extended or adjusted under 35 U.S.C. 154(b) by 0 days.

(21) Appl. No.: 17/584,019

(22) Filed: Jan. 25, 2022

(65) Prior Publication Data

US 2022/0224976 A1    Jul. 14, 2022

Related U.S. Application Data

(63) Continuation of application No. 17/028,026, filed on Sep. 22, 2020, now Pat. No. 11,272,248, which is a
(Continued)

(51) Int. Cl.
*H04N 21/431* (2011.01)
*G06F 16/40* (2019.01)
(Continued)

(52) U.S. Cl.
CPC ....... *H04N 21/44008* (2013.01); *G06F 16/40* (2019.01); *H04N 5/765* (2013.01);
(Continued)

(58) Field of Classification Search
CPC .............................. H04N 21/44008
See application file for complete search history.

(56) References Cited

U.S. PATENT DOCUMENTS

| 4,677,466 A | 6/1987 | Lert, Jr. et al. |
| 4,697,209 A | 9/1987 | Kiewit et al. |

(Continued)

FOREIGN PATENT DOCUMENTS

| CA | 2501316 | 9/2005 |
| CN | 1557096 | 12/2004 |

(Continued)

OTHER PUBLICATIONS

International Search Report and Written Opinion of Mar. 31, 2015 for PCT Application No. PCT/US2014/072255, 8 pages.
(Continued)

*Primary Examiner* — Hsiungfei Peng
(74) *Attorney, Agent, or Firm* — POLSINELLI LLP

(57) ABSTRACT

Systems and methods for identifying which video segment is being displayed on a screen of a television system. The video segment is identified by deriving data from the television signals, the derived data being indicative of the video segment being displayed on file screen. This feature can be used to extract a viewer's reaction (such as changing the channel) to a specific video segment (such as an advertisement) and reporting the extracted information as metrics. The systems and methods may further provide contextually targeted content to the television system. The contextual targeting is based on not only identification of the video segment being displayed, but also a determination concerning the playing time or offset time of the particular portion of the video segment being currently displayed.

20 Claims, 14 Drawing Sheets

Related U.S. Application Data continuation of application No. 16/290,055, filed on Mar. 1, 2019, now Pat. No. 10,820,048, which is a continuation of application No. 15/796,692, filed on Oct. 27, 2017, now Pat. No. 10,271,098, which is a continuation of application No. 14/551,933, filed on Nov. 24, 2014, now Pat. No. 9,906,834, which is a continuation-in-part of application No. 14/217,425, filed on Mar. 17, 2014, now Pat. No. 9,071,868, and a continuation-in-part of application No. 14/217,375, filed on Mar. 17, 2014, now Pat. No. 9,094,714, and a continuation-in-part of application No. 14/217,094, filed on Mar. 17, 2014, now Pat. No. 8,930,980, and a continuation-in-part of application No. 14/217,075, filed on Mar. 17, 2014, now Pat. No. 9,055,309, and a continuation-in-part of application No. 14/217,039, filed on Mar. 17, 2014, now Pat. No. 9,055,335, and a continuation-in-part of application No. 14/217,435, filed on Mar. 17, 2014, now Pat. No. 9,094,715, which is a continuation of application No. 14/089,003, filed on Nov. 25, 2013, now Pat. No. 8,898,714, said application No. 14/551,933 is a continuation-in-part of application No. 12/788,748, filed on May 27, 2010, now Pat. No. 8,769,584, which is a continuation of application No. 12/788,721, filed on May 27, 2010, now Pat. No. 8,595,781.

(60) Provisional application No. 61/791,578, filed on Mar. 15, 2013, provisional application No. 61/290,714, filed on Dec. 29, 2009, provisional application No. 61/182,334, filed on May 29, 2009.

(51) Int. Cl.
| | |
|---|---|
| *H04N 5/765* | (2006.01) |
| *H04N 9/82* | (2006.01) |
| *H04N 21/234* | (2011.01) |
| *H04N 21/235* | (2011.01) |
| *H04N 21/236* | (2011.01) |
| *H04N 21/24* | (2011.01) |
| *H04N 21/435* | (2011.01) |
| *H04N 21/439* | (2011.01) |
| *H04N 21/44* | (2011.01) |
| *H04N 21/442* | (2011.01) |
| *H04N 21/45* | (2011.01) |
| *H04N 21/462* | (2011.01) |
| *H04N 21/466* | (2011.01) |
| *H04N 21/47* | (2011.01) |
| *H04N 21/658* | (2011.01) |
| *H04N 21/81* | (2011.01) |
| *H04N 21/478* | (2011.01) |

(52) U.S. Cl.
CPC ..... *H04N 9/8205* (2013.01); *H04N 21/23418* (2013.01); *H04N 21/235* (2013.01); *H04N 21/2353* (2013.01); *H04N 21/236* (2013.01); *H04N 21/23614* (2013.01); *H04N 21/2401* (2013.01); *H04N 21/4316* (2013.01); *H04N 21/435* (2013.01); *H04N 21/4394* (2013.01); *H04N 21/44204* (2013.01); *H04N 21/44213* (2013.01); *H04N 21/44222* (2013.01); *H04N 21/4532* (2013.01); *H04N 21/462* (2013.01); *H04N 21/4667* (2013.01); *H04N 21/47* (2013.01); *H04N 21/6581* (2013.01); *H04N 21/6582* (2013.01); *H04N 21/8126* (2013.01); *H04N 21/8133* (2013.01); *H04N 21/4424* (2013.01); *H04N 21/478* (2013.01); *H04N 21/812* (2013.01)

(56) References Cited

U.S. PATENT DOCUMENTS

| | | |
|---|---|---|
| 4,739,398 A | 4/1988 | Thomas et al. |
| 5,019,899 A | 5/1991 | Boles et al. |
| 5,193,001 A | 3/1993 | Kerdranvrat |
| 5,210,820 A | 5/1993 | Kenyon |
| 5,319,453 A | 6/1994 | Copriviza et al. |
| 5,436,653 A | 7/1995 | Ellis et al. |
| 5,473,607 A | 12/1995 | Hausman |
| 5,481,294 A | 1/1996 | Thomas et al. |
| 5,557,334 A | 9/1996 | Legate |
| 5,572,246 A | 11/1996 | Ellis et al. |
| 5,812,286 A | 9/1998 | Li |
| 5,826,165 A | 10/1998 | Echeita et al. |
| 5,918,223 A | 6/1999 | Blum et al. |
| 6,008,802 A | 12/1999 | Goldschmidt et al. |
| 6,025,837 A | 2/2000 | Matthews, III et al. |
| 6,035,177 A | 3/2000 | Moses et al. |
| 6,064,764 A | 5/2000 | Bhaskaran et al. |
| 6,298,482 B1 | 10/2001 | Seidman |
| 6,381,362 B1 | 4/2002 | Deshpande et al. |
| 6,415,438 B1 | 7/2002 | Blackketter et al. |
| 6,463,585 B1 | 10/2002 | Hendricks et al. |
| 6,469,749 B1 | 10/2002 | Dimitrova |
| 6,577,346 B1 | 6/2003 | Perlman |
| 6,577,405 B2 | 6/2003 | Kranz et al. |
| 6,628,801 B2 | 9/2003 | Powell et al. |
| 6,647,548 B1 | 11/2003 | Lu et al. |
| 6,675,174 B1 | 1/2004 | Bolle et al. |
| 6,771,316 B1 | 8/2004 | Iggulden |
| 6,804,659 B1 | 10/2004 | Graham et al. |
| 6,978,470 B2 | 12/2005 | Swix et al. |
| 6,990,453 B2 | 1/2006 | Wang et al. |
| 7,028,327 B1 | 4/2006 | Dougherty et al. |
| 7,039,930 B1 | 5/2006 | Goodman et al. |
| 7,050,068 B1 | 5/2006 | Bastos et al. |
| 7,051,351 B2 | 5/2006 | Goldman et al. |
| 7,064,796 B2 | 6/2006 | Roy et al. |
| 7,089,575 B2 | 8/2006 | Agnihotri et al. |
| 7,098,959 B2 | 8/2006 | Mishima et al. |
| 7,136,875 B2 | 11/2006 | Anderson et al. |
| 7,178,106 B2 | 2/2007 | Lamkin et al. |
| 7,210,157 B2 | 4/2007 | Devara |
| 7,243,239 B2 | 7/2007 | Kirovski |
| 7,325,013 B2 | 1/2008 | Caruso |
| 7,346,512 B2 | 3/2008 | Wang et al. |
| 7,356,830 B1 | 4/2008 | Dimitrova |
| 7,421,723 B2 | 9/2008 | Harkness et al. |
| 7,545,984 B1 | 6/2009 | Kiel et al. |
| 7,590,998 B2 | 9/2009 | Hanley |
| 7,623,823 B2 | 11/2009 | Zito et al. |
| 7,787,696 B2 | 8/2010 | Wilhelm et al. |
| 7,793,318 B2 | 9/2010 | Deng |
| 7,933,451 B2 | 4/2011 | Kloer |
| 7,991,764 B2 | 8/2011 | Rathod |
| 8,001,571 B1 | 8/2011 | Schwartz et al. |
| 8,094,872 B1 | 1/2012 | Yagnik et al. |
| 8,171,004 B1 | 5/2012 | Kaminski, Jr. et al. |
| 8,171,030 B2 | 5/2012 | Peira et al. |
| 8,175,413 B1 | 5/2012 | Ioffe et al. |
| 8,189,945 B2 | 5/2012 | Stojancic et al. |
| 8,195,589 B2 | 6/2012 | Bakke et al. |
| 8,195,689 B2 | 6/2012 | Ramanathan et al. |
| 8,229,227 B2 | 7/2012 | Stojancic et al. |
| 8,335,786 B2 | 12/2012 | Peira et al. |
| 8,352,535 B2 | 1/2013 | Peled |
| 8,364,703 B2 | 1/2013 | Ramanathan et al. |
| 8,385,644 B2 | 2/2013 | Stojancic et al. |
| 8,392,789 B2 | 3/2013 | Bisconti et al. |
| 8,494,234 B1 | 7/2013 | Djordjevic et al. |
| 8,522,283 B2 | 8/2013 | Laligand et al. |
| 8,595,781 B2 | 11/2013 | Neumeier et al. |
| 8,619,877 B2 | 12/2013 | McDowell |
| 8,625,902 B2 | 1/2014 | Baheti et al. |
| 8,769,854 B1 | 7/2014 | Battaglia |
| 8,776,105 B2 | 7/2014 | Sinha et al. |
| 8,788,328 B1 | 7/2014 | George |

(56) References Cited

U.S. PATENT DOCUMENTS

| | | |
|---|---|---|
| 8,832,723 B2 | 9/2014 | Sinha et al. |
| 8,856,817 B2 | 10/2014 | Sinha et al. |
| 8,893,167 B2 | 11/2014 | Sinha et al. |
| 8,893,168 B2 | 11/2014 | Sinha et al. |
| 8,898,714 B2 | 11/2014 | Neumeier et al. |
| 8,918,804 B2 | 12/2014 | Sinha et al. |
| 8,918,832 B2 | 12/2014 | Sinha et al. |
| 8,930,980 B2 | 1/2015 | Neumeier et al. |
| 8,959,202 B2 | 2/2015 | Haitsma et al. |
| 9,055,309 B2 | 6/2015 | Neumeier et al. |
| 9,055,335 B2 | 6/2015 | Neumeier et al. |
| 9,071,868 B2 | 6/2015 | Neumeier et al. |
| 9,083,710 B1 | 7/2015 | Yadav |
| 9,094,714 B2 | 7/2015 | Neumeier et al. |
| 9,094,715 B2 | 7/2015 | Neumeier et al. |
| 9,262,671 B2 | 2/2016 | Unzueta |
| 9,368,021 B2 | 6/2016 | Touloumtzis |
| 9,432,616 B1 | 8/2016 | Hurd |
| 9,449,090 B2 | 9/2016 | Neumeier et al. |
| 9,465,867 B2 | 10/2016 | Hoarty |
| 9,484,065 B2 | 11/2016 | McDowell |
| 9,838,753 B2 | 12/2017 | Neumeier et al. |
| 9,955,192 B2 | 4/2018 | Neumeier et al. |
| 10,080,062 B2 | 9/2018 | Neumeier et al. |
| 10,116,972 B2 | 10/2018 | Neumeier et al. |
| 10,169,455 B2 | 1/2019 | Neumeier et al. |
| 10,185,768 B2 | 1/2019 | Neumeier et al. |
| 10,192,138 B2 | 1/2019 | Neumeier et al. |
| 10,271,098 B2 | 4/2019 | Neumeier et al. |
| 10,284,884 B2 | 5/2019 | Neumeier et al. |
| 10,306,274 B2 | 5/2019 | Neumeier et al. |
| 10,375,451 B2 | 8/2019 | Neumeier et al. |
| 10,405,014 B2 | 9/2019 | Neumeier et al. |
| 10,482,349 B2 | 11/2019 | Neumeier |
| 10,674,223 B2 | 6/2020 | Neumeier et al. |
| 10,820,048 B2 | 10/2020 | Neumeier et al. |
| 11,272,248 B2 | 3/2022 | Neumeier et al. |
| 2001/0039658 A1 | 11/2001 | Walton |
| 2001/0044992 A1 | 11/2001 | Jahrling |
| 2002/0026635 A1 | 2/2002 | Wheeler et al. |
| 2002/0054069 A1 | 5/2002 | Britt et al. |
| 2002/0054695 A1 | 5/2002 | Bjorn et al. |
| 2002/0056088 A1 | 5/2002 | Silva, Jr. et al. |
| 2002/0059633 A1 | 5/2002 | Harkness et al. |
| 2002/0078144 A1 | 6/2002 | Lamkin et al. |
| 2002/0083060 A1 | 6/2002 | Wang et al. |
| 2002/0083442 A1 | 6/2002 | Eldering |
| 2002/0100041 A1 | 7/2002 | Rosenberg et al. |
| 2002/0105907 A1 | 8/2002 | Bruekers et al. |
| 2002/0120925 A1 | 8/2002 | Logan |
| 2002/0122042 A1 | 9/2002 | Bates |
| 2002/0144262 A1 | 10/2002 | Plotnick |
| 2002/0162117 A1 | 10/2002 | Pearson et al. |
| 2002/0162118 A1 | 10/2002 | Levy et al. |
| 2003/0026422 A1 | 2/2003 | Gerheim et al. |
| 2003/0086341 A1 | 5/2003 | Wells |
| 2003/0105794 A1 | 6/2003 | Jashinschi |
| 2003/0118243 A1 | 6/2003 | Sezer |
| 2003/0121037 A1 | 6/2003 | Swix et al. |
| 2003/0121046 A1 | 6/2003 | Roy et al. |
| 2003/0147561 A1 | 8/2003 | Faibish et al. |
| 2003/0182291 A1 | 9/2003 | Kurupati |
| 2003/0188321 A1 | 10/2003 | Shoff et al. |
| 2003/0208763 A1 | 11/2003 | McElhatten et al. |
| 2004/0045020 A1 | 3/2004 | Witt et al. |
| 2004/0059708 A1 | 3/2004 | Dean et al. |
| 2004/0183825 A1 | 9/2004 | Stauder et al. |
| 2004/0216171 A1 | 10/2004 | Barone et al. |
| 2004/0221237 A1 | 11/2004 | Foote et al. |
| 2004/0226035 A1 | 11/2004 | Hauser |
| 2004/0237102 A1 | 11/2004 | Konig |
| 2004/0240562 A1 | 12/2004 | Bargeron et al. |
| 2005/0015795 A1 | 1/2005 | Iggulden |
| 2005/0015796 A1 | 1/2005 | Bruckner et al. |
| 2005/0027766 A1 | 2/2005 | Ben |
| 2005/0066352 A1 | 3/2005 | Herley |
| 2005/0120372 A1 | 6/2005 | Itakura |
| 2005/0149968 A1 | 7/2005 | Konig et al. |
| 2005/0172312 A1 | 8/2005 | Lienhart et al. |
| 2005/0207416 A1 | 9/2005 | Rajkotia |
| 2005/0209065 A1 | 9/2005 | Schlosser et al. |
| 2005/0235318 A1 | 10/2005 | Grauch et al. |
| 2006/0029286 A1 | 2/2006 | Lim et al. |
| 2006/0029368 A1 | 2/2006 | Harville |
| 2006/0031914 A1 | 2/2006 | Dakss et al. |
| 2006/0116989 A1 | 6/2006 | Bellannkonda |
| 2006/0120624 A1 | 6/2006 | Jojic |
| 2006/0133647 A1 | 6/2006 | Werner et al. |
| 2006/0153296 A1 | 7/2006 | Deng |
| 2006/0155952 A1 | 7/2006 | Haas |
| 2006/0173831 A1 | 8/2006 | Basso et al. |
| 2006/0187358 A1 | 8/2006 | Lienhart et al. |
| 2006/0193506 A1 | 8/2006 | Dorphan et al. |
| 2006/0195857 A1 | 8/2006 | Wheeler et al. |
| 2006/0195860 A1 | 8/2006 | Eldering et al. |
| 2006/0245724 A1 | 11/2006 | Hwang et al. |
| 2006/0245725 A1 | 11/2006 | Lim |
| 2006/0253330 A1 | 11/2006 | Maggio et al. |
| 2006/0277047 A1 | 12/2006 | DeBusk et al. |
| 2006/0294561 A1 | 12/2006 | Grannan et al. |
| 2007/0009235 A1 | 1/2007 | Walters et al. |
| 2007/0033608 A1 | 2/2007 | Eigeldinger |
| 2007/0050832 A1 | 3/2007 | Wright et al. |
| 2007/0061724 A1 | 3/2007 | Slothouber et al. |
| 2007/0061831 A1 | 3/2007 | Savoor et al. |
| 2007/0083901 A1 | 4/2007 | Bond |
| 2007/0094696 A1 | 4/2007 | Sakai |
| 2007/0109449 A1 | 5/2007 | Cheung |
| 2007/0113263 A1 | 5/2007 | Chatani |
| 2007/0139563 A1 | 6/2007 | Zhong |
| 2007/0143796 A1 | 6/2007 | Malik |
| 2007/0168409 A1 | 7/2007 | Cheung |
| 2007/0180459 A1 | 8/2007 | Smithpeters et al. |
| 2007/0192782 A1 | 8/2007 | Ramaswamy |
| 2007/0212023 A1* | 9/2007 | Whillock ........... H04N 21/4532 386/281 |
| 2007/0242880 A1 | 10/2007 | Stebbings |
| 2007/0250901 A1 | 10/2007 | McIntire et al. |
| 2007/0261070 A1 | 11/2007 | Brown et al. |
| 2007/0261075 A1 | 11/2007 | Glasberg |
| 2007/0271300 A1 | 11/2007 | Ramaswamy |
| 2007/0274537 A1 | 11/2007 | Srinivasan |
| 2007/0300280 A1 | 12/2007 | Turner et al. |
| 2008/0005086 A1 | 1/2008 | Moore |
| 2008/0044102 A1 | 2/2008 | Ekin |
| 2008/0046945 A1 | 2/2008 | Hanley |
| 2008/0089551 A1 | 4/2008 | Heather et al. |
| 2008/0138030 A1 | 6/2008 | Bryan et al. |
| 2008/0155588 A1 | 6/2008 | Roberts et al. |
| 2008/0155627 A1 | 6/2008 | O'Connor et al. |
| 2008/0172690 A1 | 7/2008 | Kanojia et al. |
| 2008/0208891 A1 | 8/2008 | Wang et al. |
| 2008/0209480 A1 | 8/2008 | Eide |
| 2008/0240562 A1 | 10/2008 | Fukuda et al. |
| 2008/0249986 A1 | 10/2008 | Clarke-Martin |
| 2008/0263620 A1 | 10/2008 | Berkvens et al. |
| 2008/0276266 A1 | 11/2008 | Huchital et al. |
| 2008/0309819 A1 | 12/2008 | Hardacker et al. |
| 2008/0310731 A1 | 12/2008 | Stojancic et al. |
| 2008/0313140 A1 | 12/2008 | Pereira et al. |
| 2009/0007195 A1 | 1/2009 | Beyabani |
| 2009/0024923 A1 | 1/2009 | Hartwig et al. |
| 2009/0028517 A1 | 1/2009 | Shen et al. |
| 2009/0052784 A1 | 2/2009 | Covell et al. |
| 2009/0087027 A1 | 4/2009 | Eaton et al. |
| 2009/0088878 A1 | 4/2009 | Otsuka et al. |
| 2009/0100361 A1 | 4/2009 | Abello et al. |
| 2009/0102973 A1* | 4/2009 | Harris ............... H04N 21/44008 348/565 |
| 2009/0116702 A1 | 5/2009 | Conradt |
| 2009/0131861 A1 | 5/2009 | Braig et al. |
| 2009/0172728 A1 | 7/2009 | Shkedi et al. |
| 2009/0172746 A1 | 7/2009 | Aldrey et al. |
| 2009/0175538 A1 | 7/2009 | Bronstein et al. |

(56) References Cited

U.S. PATENT DOCUMENTS

| | | |
|---|---|---|
| 2009/0213270 A1 | 8/2009 | Ismert et al. |
| 2009/0235312 A1 | 9/2009 | Morad et al. |
| 2010/0010648 A1 | 1/2010 | Bull et al. |
| 2010/0042790 A1 | 2/2010 | Mondal et al. |
| 2010/0083299 A1 | 4/2010 | Nelson |
| 2010/0115543 A1 | 5/2010 | Falcon |
| 2010/0115574 A1 | 5/2010 | Hardt et al. |
| 2010/0125870 A1 | 5/2010 | Ukawa et al. |
| 2010/0166257 A1 | 7/2010 | Wredenhagen |
| 2010/0199295 A1 | 8/2010 | Katpelly et al. |
| 2010/0235486 A1 | 9/2010 | White et al. |
| 2010/0253838 A1 | 10/2010 | Garg et al. |
| 2010/0269138 A1 | 10/2010 | Krikorian et al. |
| 2010/0306805 A1 | 12/2010 | Neumeier et al. |
| 2010/0306808 A1 | 12/2010 | Neumeier et al. |
| 2011/0015996 A1 | 1/2011 | Kassoway et al. |
| 2011/0026761 A1 | 2/2011 | Radhakrishnan et al. |
| 2011/0041154 A1 | 2/2011 | Olson |
| 2011/0055552 A1 | 3/2011 | Francis et al. |
| 2011/0096955 A1 | 4/2011 | Voloshynovskiy et al. |
| 2011/0251987 A1 | 4/2011 | Buchheit |
| 2011/0247042 A1 | 10/2011 | Mallinson |
| 2011/0289099 A1 | 11/2011 | Quan |
| 2011/0299770 A1 | 12/2011 | Vaddadi et al. |
| 2011/0307683 A1 | 12/2011 | Spackman |
| 2012/0017240 A1 | 1/2012 | Shkedi |
| 2012/0054143 A1 | 3/2012 | Doig et al. |
| 2012/0076357 A1 | 3/2012 | Yamamoto et al. |
| 2012/0095958 A1 | 4/2012 | Pereira et al. |
| 2012/0117584 A1 | 5/2012 | Gordon |
| 2012/0158511 A1 | 6/2012 | Lucero et al. |
| 2012/0174155 A1 | 7/2012 | Mowrey et al. |
| 2012/0177249 A1 | 7/2012 | Levy et al. |
| 2012/0185566 A1 | 7/2012 | Nagasaka |
| 2012/0272259 A1 | 10/2012 | Cortes |
| 2012/0294586 A1 | 11/2012 | Weaver et al. |
| 2012/0317240 A1 | 12/2012 | Wang |
| 2012/0324494 A1 | 12/2012 | Burger et al. |
| 2012/0327450 A1 | 12/2012 | Sagan |
| 2013/0007191 A1 | 1/2013 | Klappert et al. |
| 2013/0007792 A1 | 1/2013 | Jeon et al. |
| 2013/0042262 A1 | 2/2013 | Riethmueller |
| 2013/0050564 A1 | 2/2013 | Adams et al. |
| 2013/0054356 A1 | 2/2013 | Richman et al. |
| 2013/0067523 A1 | 3/2013 | Etsuko et al. |
| 2013/0070847 A1 | 3/2013 | Iwamoto et al. |
| 2013/0108173 A1 | 5/2013 | Lienhart et al. |
| 2013/0139209 A1 | 5/2013 | Urrabazo et al. |
| 2013/0198768 A1 | 8/2013 | Kitazato |
| 2013/0202150 A1 | 8/2013 | Sinha et al. |
| 2013/0205315 A1 | 8/2013 | Sinha |
| 2013/0209065 A1 | 8/2013 | Yeung |
| 2013/0212609 A1 | 8/2013 | Sinha et al. |
| 2013/0290502 A1 | 10/2013 | Bilobrov |
| 2013/0297727 A1 | 11/2013 | Levy |
| 2013/0318096 A1 | 11/2013 | Cheung |
| 2014/0016696 A1 | 1/2014 | Nelson |
| 2014/0025837 A1 | 1/2014 | Swenson |
| 2014/0028914 A1* | 1/2014 | Polak ............... H04N 21/43072 348/515 |
| 2014/0052737 A1 | 2/2014 | Ramanathan et al. |
| 2014/0082663 A1 | 3/2014 | Neumeier et al. |
| 2014/0088742 A1 | 3/2014 | Srinivasan |
| 2014/0089307 A1* | 3/2014 | Garside ............... G06F 16/738 707/736 |
| 2014/0105567 A1 | 4/2014 | Casagrande |
| 2014/0123165 A1 | 5/2014 | Mukherjee et al. |
| 2014/0130092 A1 | 5/2014 | Kunisetty |
| 2014/0152786 A1* | 6/2014 | Nicholson ............ H04N 21/812 348/61 |
| 2014/0153571 A1 | 6/2014 | Neugebauer |
| 2014/0188487 A1 | 7/2014 | Perez Gonzalez |
| 2014/0193027 A1 | 7/2014 | Scherf |
| 2014/0195548 A1 | 7/2014 | Harron |
| 2014/0196085 A1 | 7/2014 | Dunker |
| 2014/0201769 A1 | 7/2014 | Neumeier et al. |
| 2014/0201772 A1 | 7/2014 | Neumeier et al. |
| 2014/0201787 A1 | 7/2014 | Neumeier et al. |
| 2014/0219554 A1 | 8/2014 | Yamaguchi et al. |
| 2014/0237576 A1 | 8/2014 | Zhang |
| 2014/0258375 A1 | 9/2014 | Munoz |
| 2014/0270489 A1 | 9/2014 | Jaewhan et al. |
| 2014/0270504 A1 | 9/2014 | Baum et al. |
| 2014/0270505 A1 | 9/2014 | McCarthy |
| 2014/0282671 A1 | 9/2014 | McMillan |
| 2014/0293794 A1 | 10/2014 | Zhong et al. |
| 2014/0344880 A1 | 11/2014 | Geller et al. |
| 2015/0026728 A1 | 1/2015 | Carter et al. |
| 2015/0040074 A1 | 2/2015 | Hofmann et al. |
| 2015/0100979 A1 | 4/2015 | Moskowitz et al. |
| 2015/0112988 A1 | 4/2015 | Pereira et al. |
| 2015/0120839 A1 | 4/2015 | Kannan et al. |
| 2015/0121409 A1 | 4/2015 | Zhang et al. |
| 2015/0128161 A1 | 5/2015 | Conrad et al. |
| 2015/0131845 A1 | 5/2015 | Forouhar |
| 2015/0163545 A1 | 6/2015 | Freed et al. |
| 2015/0181311 A1 | 6/2015 | Navin et al. |
| 2015/0188967 A1 | 7/2015 | Paulauskas |
| 2015/0205727 A1 | 7/2015 | Kimmel |
| 2015/0229998 A1 | 8/2015 | Kaushal et al. |
| 2015/0256891 A1 | 9/2015 | Kim et al. |
| 2015/0302890 A1 | 10/2015 | Ergen et al. |
| 2015/0382075 A1 | 12/2015 | Neumeier et al. |
| 2016/0073166 A1 | 3/2016 | Hu |
| 2016/0112319 A1 | 4/2016 | Hasani |
| 2016/0154880 A1 | 6/2016 | Hoarty |
| 2016/0227261 A1 | 8/2016 | Neumeier et al. |
| 2016/0227291 A1 | 8/2016 | Shaw et al. |
| 2016/0286244 A1 | 9/2016 | Chang et al. |
| 2016/0307043 A1 | 10/2016 | Neumeier |
| 2016/0314794 A1 | 10/2016 | Leitman et al. |
| 2016/0316262 A1 | 10/2016 | Chen |
| 2016/0330529 A1 | 11/2016 | Byers |
| 2016/0353172 A1 | 12/2016 | Miller et al. |
| 2016/0359791 A1 | 12/2016 | Zhang et al. |
| 2017/0017645 A1 | 1/2017 | Neumeier et al. |
| 2017/0017651 A1 | 1/2017 | Neumeier et al. |
| 2017/0017652 A1 | 1/2017 | Neumeier et al. |
| 2017/0019716 A1 | 1/2017 | Neumeier et al. |
| 2017/0019719 A1 | 1/2017 | Neumeier et al. |
| 2017/0026671 A1 | 1/2017 | Neumeier et al. |
| 2017/0031573 A1 | 2/2017 | Kaneko |
| 2017/0032033 A1 | 2/2017 | Neumeier et al. |
| 2017/0032034 A1 | 2/2017 | Neumeier et al. |
| 2017/0090814 A1 | 3/2017 | Yeung |
| 2017/0134770 A9 | 5/2017 | Neumeier et al. |
| 2017/0186042 A1 | 6/2017 | Wong et al. |
| 2017/0311014 A1 | 10/2017 | Fleischman |
| 2017/0325005 A1 | 11/2017 | Liassides |
| 2017/0353776 A1 | 12/2017 | Holden et al. |
| 2018/0227646 A9 | 8/2018 | Navin et al. |
| 2020/0111136 A1* | 4/2020 | Briggs ............... G06Q 30/0251 |

FOREIGN PATENT DOCUMENTS

| | | |
|---|---|---|
| CN | 101162470 | 4/2008 |
| CN | 1681304 | 7/2010 |
| CN | 102377960 | 3/2012 |
| CN | 101681373 | 9/2012 |
| EP | 248 533 | 8/1994 |
| EP | 1578126 | 9/2005 |
| EP | 1 760 693 A1 | 3/2007 |
| EP | 1504445 B1 | 8/2008 |
| EP | 2 084 624 | 8/2009 |
| EP | 2 352 289 | 8/2011 |
| EP | 2 541 963 A2 | 1/2013 |
| EP | 2 685 450 A1 | 1/2014 |
| GB | 2457694 | 8/2009 |
| WO | 0144992 | 6/2001 |
| WO | 2005/101998 | 11/2005 |
| WO | 2007/114796 | 10/2007 |
| WO | 2008/065340 | 6/2008 |
| WO | 2009/131861 | 10/2009 |
| WO | 2009/150425 | 12/2009 |

(56) References Cited

FOREIGN PATENT DOCUMENTS

| WO | 2010/135082 | 11/2010 |
|---|---|---|
| WO | 2011/090540 A2 | 7/2011 |
| WO | 2012/057724 | 5/2012 |
| WO | 2012/108975 | 8/2012 |
| WO | 2012/170451 | 12/2012 |
| WO | 2014/142758 | 9/2014 |
| WO | 2014/145929 A1 | 9/2014 |
| WO | 2015/100372 A1 | 7/2015 |
| WO | 2016033676 A1 | 3/2016 |
| WO | 2016/123495 | 8/2016 |
| WO | 2016/168556 | 10/2016 |
| WO | 2017/011758 | 1/2017 |
| WO | 2017/011792 | 1/2017 |

OTHER PUBLICATIONS

International Search Report and Written Opinion of Apr. 26, 2016 for PCT Application No. PCT/US2016/015681,13 pages.
"How to: Watch from the beginning |About DISH" (Dec. 31, 2014) XP055265764, retrieved on Apr. 15, 2016 from URL:http://about.dish.com/blog/hopper/how-watch-beginning 2 pages.
International Search Report and Written Opinion of Jun. 24, 2016 for PCT Application No. PCT/US2016/027691, 13 pages.
Gionis et al., "Similarity Search in High Dimension via Hashing", Proceedings of the 25th VLDB Conference, 1999, 12 pages.
Huang , "Bounded Coordinate System Indexing for Real-time Video Clip Search", Retrieved from the Internet: URL:http://staff.itee.uq.edu.aujzxf/ papers/TOIS.pdf, Jan. 1, 2009, 32 pages.
Kim et al., "Edge-Based Spatial Descriptor Using Color Vector Angle for Effective Image Retrieval", Modeling Decisions for Artificial Intelligence; [Lecture Notes in Computer Science; Lecture Notes in Artificial Intelligence, Jul. 1, 2005, pp. 365-375.
Liu et al., "Near-duplicate video retrieval", ACM Computing Surveys, vol. 45, No. 4, Aug. 30, 2013, pp. 1-23.
International Search Report and Written Opinion of Oct. 12, 2016 for PCT Application No. PCT/US2016/042522,13 pages.
International Search Report and Written Opinion of Oct. 11, 2016 for PCT Application No. PCT/US2016/042621, 13 pages.
International Search Report and Written Opinion of Oct. 20, 2016 for PCT Application No. PCT/US2016/042611,12 pages.
Scouarnec et al., "Cache policies for cloud-based systems:To keep or not to keep", 2014 IEEE 7th International Conference On Cloud Computing, IEEE XP032696624, Jun. 27, 2014, pp. 1-8.
International Search Report and Written Opinion of Oct. 25, 2016 for PCT Application No. PCT/US2016/042564, 14 pages.
Anonymous; "Cache (computing)" Wikipedia, the free encyclopedia, URL:http://en.wikipedia.org/w/index.phptitle=Cache(computing)&oldid=474222804, Jan. 31, 2012; 6 pages.
International Search Report and Written Opinion of Oct. 24, 2016 for PCT Application No. PCT/US2016/042557, 11 pages.
Anil K. Jain, "Image Coding Via a Nearest Neighbors Image Model" IEEE Transactions on Communications, vol. Com-23, No. 3, Mar. 1975, pp. 318-331.
Lee et al., "Fast Video Search Algorithm for Large Video Database Using Adjacent Pixel Intensity Difference Quantization Histogram Feature" International Journal of Computer Science and Network Security, vol. 9, No. 9, Sep. 2009, pp. 214-220.
Li et al., A Confidence Based Recognition System for TV Commercial Extraction, Conferences in Research and Practice in Information Technology vol. 75, 2008.
International Search Report and Written Opinion of Jul. 27, 2011 for PCT Application No. PCT/US2010/057153, 8 pages.
International Search Report and Written Opinion of Aug. 31, 2011 for PCT Application No. PCT/US2010/057155, 8 pages.
International Search Report and Written Opinion of Aug. 26, 2014 for PCT Application No. PCT/US2014/030782; 11 pages.
International Search Report and Written Opinion of Jul. 21, 2014 for PCT Application No. PCT/US2014/030795; 10 pages.
International Search Report and Written Opinion, dated Jul. 25, 2014 for PCT Application No. PCT/US2014/030805, 10 pages.
Extended European Search Report of Mar. 7, 2013 for European Application No. 12178359.1, 8 pages.
Extended European Search Report of Oct. 11, 2013 for European Application No. 10844152.8, 19 pages.
Kabal (P.), Ramachandran (R.P.): The computation of line spectral frequencies using Chebyshev polynomials, IEEE Trans. on ASSP, vol. 34, No. 6, pp. 1419-1426, 1986.
Itakura (F.): Line spectral representation of linear predictive coefficients of speech signals, J. Acoust. Soc. Amer., vol. 57, Supplement No. 1, S35, 1975, 3 pages.
Bistritz (Y.), Pellerm (S.): Immittance Spectral Pairs (ISP) for speech encoding, Proc. ICASSP'93, pp. 11-19 to 11-12.
International Search Report and Written Opinion of Mar. 8, 2016 for PCT Application No. PCT/ US2015/062945; 9 pages.
Extended European Search Report of Dec. 21, 2016 for European Application No. 14763506.4, 11 pages.
Extended European Search Report of Nov. 23, 2016 for European Application No. 14764182.3, 10 pages.
Extended European Search Report of Jan. 24, 2017 for European Application No. 14762850.7, 12 pages.
Extended European Search Report of Jun. 16, 2017, for European Patent Application No. 14873564.0, 8 pages.
Extended European Search Report of Jun. 28, 2019, for European Patent Application No. 19166400.2, 9 pages.
U.S. Appl. No. 14/551,933, "Final Office Action", May 23, 2016, 19 pages.
U.S. Appl. No. 14/551,933, "Non-Final Office Action", Oct. 17, 2016, 15 pages.
U.S. Appl. No. 14/551,933, "Non-Final Office Action", Dec. 31, 2015, 24 pages.
U.S. Appl. No. 14/551,933, "Notice of Allowance", Mar. 21, 2017, 8 pages.
U.S. Appl. No. 14/217,039, "Non-Final Office Action", May 23, 2014, 27 pages.
U.S. Appl. No. 14/217,039, "Final Office Action", Nov. 7, 2014, 15 pages.
U.S. Appl. No. 14/217,039, "Notice of Allowance", Jan. 29, 2015, 8 pages.
U.S. Appl. No. 14/678,856, "Non-Final Office Action", Dec. 1, 2015, 28 pages.
U.S. Appl. No. 14/678,856, "Notice of Allowance", May 20, 2016, 9 pages.
U.S. Appl. No. 14/217,075, "Non-Final Office Action", Jul. 16, 2014, 39 pages.
U.S. Appl. No. 14/217,075, "Notice of Allowance ", Feb. 20, 2015, 51 pages.
U.S. Appl. No. 14/217,094, "Notice of Allowance ", Sep. 4, 2014, 30 pages.
U.S. Appl. No. 14/217,375, "Non-Final Office Action", Apr. 1, 2015, 39 pages.
U.S. Appl. No. 14/217,375, "Notice of Allowance", Apr. 1, 2015, 31 pages.
U.S. Appl. No. 14/217,425, "Non-Final Office Action", Apr. 7, 2015, 12 pages.
U.S. Appl. No. 14/217,425, "Notice of Allowance", May 20, 2015, 15 pages.
U.S. Appl. No. 14/217,435, "Non-Final Office Action", Nov. 24, 2014, 9 pages.
U.S. Appl. No. 14/217,435, "Notice of Allowance", Jun. 5, 2015, 9 pages.
U.S. Appl. No. 15/011,099, "First Action Interview Office Action Summary", May 9, 2017, 6 pages.
U.S. Appl. No. 15/011,099, "First Action Interview Pilot Program Pre-Interview Communication", Feb. 28, 2017, 5 pages.
U.S. Appl. No. 12/788,721, "Non-Final Office Action", Mar. 28, 2012, 15 Pages.
U.S. Appl. No. 12/788,721, "Final Office Action", Aug. 15, 2012, 22 Pages.
U.S. Appl. No. 12/788,721, "Notice of Allowance", Aug. 15, 2013, 16 Pages.

(56) References Cited

OTHER PUBLICATIONS

U.S. Appl. No. 14/763,158, "Non-Final Office Action", Jun. 27, 2016, 16 Pages.
U.S. Appl. No. 14/763,158, "Final Office Action", Sep. 7, 2016, 12 Pages.
U.S. Appl. No. 14/763,158, "Notice of Allowance", Mar. 17, 2016, 8 Pages.
U.S. Appl. No. 14/807,849, "Non-Final Office Action", Nov. 25, 2015, 12 Pages.
U.S. Appl. No. 14/807,849, "Final Office Action", Apr. 19, 2016, 13 pages.
U.S. Appl. No. 14/807,849, "Non-Final Office Action", Feb. 28, 2017, 10 Pages.
U.S. Appl. No. 14/089,003, "Notice of Allowance", Jul. 30, 2014, 24 Pages.
U.S. Appl. No. 12/788,748, "Non-Final Office Action", Jan. 10, 2013, 10 Pages.
U.S. Appl. No. 12/788,748, "Final Office Action", Nov. 21, 2013, 13 Pages.
U.S. Appl. No. 12/788,748, "Notice of Allowance", Mar. 6, 2014, 7 Pages.
U.S. Appl. No. 14/953,994, "Non-Final Office Action", Mar. 3, 2016, 34 Pages.
U.S. Appl. No. 14/953,994, "Final Office Action", Jun. 1, 2016, 36 Pages.
U.S. Appl. No. 14/953,994, "Notice of Allowance", Aug. 31, 2016, 15 Pages.
U.S. Appl. No. 14/807,849, "Final Office Action", Jun. 22, 2017, 10 pages.
U.S. Appl. No. 15/011,099, "Final Office Action", Jul. 24, 2017, 22 pages.
U.S. Appl. No. 15/240,801, "Non-Final Office Action", Aug. 11, 2017, 18 pages.
U.S. Appl. No. 15/240,815, "Non-Final Office Action", Aug. 23, 2017, 15 pages.
U.S. Appl. No. 15/211,345, "First Action Interview Pilot Program Pre-Interview Communication", Sep. 19, 2017, 8 pages.
U.S. Appl. No. 14/807,849, "Notice of Allowance", Nov. 30, 2017, 9 Pages.
U.S. Appl. No. 15/240,801, "Final Office Action", Dec. 22, 2017, 24 pages.
U.S. Appl. No. 15/011,099, "Non-Final Office Action", Jan. 22, 2018, 23 pages.
U.S. Appl. No. 15/240,815, "Final Office Action", Mar. 2, 2018, 14 pages.
U.S. Appl. No. 15/211,345, "Final Office Action", Mar. 2, 2018, 14 pages.
Extended European Search Report of Mar. 22, 2018 for European Application No. 15865033.3, 10 pages.
U.S. Appl. No. 15/099,842, "Final Office Action", Apr. 2, 2018, 8 pages.
U.S. Appl. No. 15/210,730, "Notice of Allowance", May 23, 2018, 10 pages.
U.S. Appl. No. 15/796,706, "Non-Final Office Action", Jun. 26, 2018, 17 pages.
U.S. Appl. No. 15/011,099, "Notice of Allowance", Jun. 28, 2018, 12 pages.
U.S. Appl. No. 15/796,698, "Non-Final Office Action", Jul. 5, 2018, 15 pages.
U.S. Appl. No. 15/240,801, "Notice of Allowance", Aug. 30, 2018, 9 pages.
U.S. Appl. No. 15/211,345, "Non-Final Office Action", Sep. 4, 2018, 13 pages.
U.S. Appl. No. 15/099,842, "Notice of Allowance", Sep. 7, 2018, 10 pages.
U.S. Appl. No. 15/240,815, "Notice of Allowance", Sep. 12, 2018, 9 pages.
U.S. Appl. No. 15/290,848, "First Action Interview Office Action Summary", Nov. 2, 2018, 5 pages.
U.S. Appl. No. 15/796,692, "Notice of Allowance", Dec. 5, 2018, 8 pages.
U.S. Appl. No. 15/796,698, "Notice of Allowance", Dec. 20, 2018, 8 pages.
U.S. Appl. No. 15/796,706, "Notice of Allowance", Jan. 11, 2019, 9 pages.
U.S. Appl. No. 15/211,508, "Non-Final Office Action", Jan. 10, 2019, 20 pages.
U.S. Appl. No. 15/211,492, "Non-Final Office Action", Jan. 11, 2019, 19 pages.
U.S. Appl. No. 16/141,598, "First Action Interview Office Action Summary", Jan. 11, 2019, 8 pages.
U.S. Appl. No. 15/290,848, "Non-Final Office Action", Mar. 5, 2019, 5 pages.
U.S. Appl. No. 15/211,991, "Non-Final Office Action", Feb. 26, 2019, 8 pages.
U.S. Appl. No. 15/211,345, "Notice of Allowance", Mar. 20, 2019, 6 pages.
U.S. Appl. No. 16/210,796, "Non-Final Office Action", Mar. 22, 2019, 7 pages.
U.S. Appl. No. 16/141,598, "Notice of Allowance", Apr. 25, 2019, 11 pages.
U.S. Appl. No. 15/211,508, "Final Office Action", Jun. 20, 2019, 20 pages.
U.S. Appl. No. 15/211,492, "Final Office Action", Jun. 20, 2019, 18 pages.
U.S. Appl. No. 16/210,796, "Notice of Allowance", Jul. 11, 2019, 9 pages.
U.S. Appl. No. 16/214,875, "Non-Final Office Action", Jul. 29, 2019, 12 pages.
U.S. Appl. No. 15/211,991, "Final Office Action", Oct. 31, 2019, 9 pages.
U.S. Appl. No. 16/214,875, "Final Office Action", Jan. 29, 2020, 13 pages.
U.S. Appl. No. 16/290,055, "Non-Final Office Action", Feb. 19, 2020, 18 pages.
U.S. Appl. No. 16/379,663, "Non-Final Office Action", Feb. 24, 2020, 19 pages.
U.S. Appl. No. 15/211,991, "Non-Final Office Action", Mar. 19, 2020, 19 pages.
U.S. Appl. No. 15/211,508, "Non-Final Office Action", Apr. 3, 2020, 25 pages.
U.S. Appl. No. 15/211,492, "Non-Final Office Action", Apr. 6, 2020, 18 pages.
U.S. Appl. No. 16/290,055, "Notice of Allowance", Jun. 25, 2020, 10 pages.
U.S. Appl. No. 16/214,875, "Non-Final Office Action", Jul. 15, 2020, 21 pages.
U.S. Appl. No. 16/379,663, "Final Office Action", Jul. 28, 2020, 15 pages.
U.S. Appl. No. 16/444,152, "Notice of Allowance", Aug. 19, 2020, 6 pages.
U.S. Appl. No. 15/211,991, "Notice of Allowance", Sep. 17, 2020, 13 pages.
U.S. Appl. No. 15/211,492, "Final Office Action", Oct. 26, 2020, 18 pages.
U.S. Appl. No. 15/211,508, "Notice of Allowance", Oct. 27, 2020, 13 pages.
U.S. Appl. No. 16/519,292, "Notice of Allowance ", Oct. 29, 2020, 10 pages.
U.S. Appl. No. 16/214,875, "Final Office Action", Nov. 30, 2020, 17 pages.
U.S. Appl. No. 16/379,663, "Notice of Allowance", Feb. 16, 2021, 9 pages.
U.S. Appl. No. 17/028,026, "Non-Final Office Action", Jun. 22, 2021, 15 pages.
U.S. Appl. No. 17/028,026, "Notice of Allowance", Dec. 30, 2021, 9 pages.

* cited by examiner

METHODS FOR IDENTIFYING VIDEO SEGMENTS AND DISPLAYING CONTEXTUALLY TARGETED CONTENT ON A CONNECTED TELEVISION

CROSS-REFERENCES TO RELATED APPLICATIONS

This application is a continuation of U.S. patent application Ser. No. 17/028,026, filed Sep. 22, 2020 which is a continuation of U.S. patent application Ser. No. 16/290,055, filed Mar. 1, 2019, which is a continuation of U.S. patent application Ser. No. 15/796,692, filed Oct. 27, 2017, which is a continuation of U.S. patent application Ser. No. 14/551,933, filed Nov. 24, 2014, which is a Continuation-in-part of U.S. patent application Ser. No. 14/217,425, filed Mar. 17, 2014, which is also a Continuation-in-part of U.S. patent application Ser. No. 14/217,375, filed Mar. 17, 2014, which is also a Continuation-in-part of Ser. No. 14/217,094, filed on Mar. 17, 2014, which is also a Continuation-in-part of Ser. No. 14/217,075, filed on Mar. 17, 2014, which is also a Continuation-in-part of Ser. No. 14/217,039, filed on Mar. 17, 2014, which is also a Continuation-in-part of Ser. No. 14/217,435, filed on Mar. 17, 2014, which is a continuation of Ser. No. 14/089,003, filed on Nov. 25, 2013, which claims priority under 35 U.S.C. § 119(e) to U.S. Provisional Patent Application No. 61/791,578, filed Nov. 25, 2013. U.S. patent application Ser. No. 14/551,933 is also a Continuation-in-part of U.S. patent application Ser. No. 12/788,748, filed May 27, 2010, which is a continuation of U.S. patent application Ser. No. 12/788,721, filed May 27, 2010, which claims priority under 35 U.S.C. § 119(e) to U.S. Provisional Patent Application No. 61/290,714, filed Dec. 29, 2009 and U.S. Patent Provisional Application 61/182,334, filed on May 29, 2009. The entire contents of each of the patent applications identified above are hereby incorporated by reference in their entirety for all purposes.

BACKGROUND

This invention generally relates to systems and methods for identifying video segments being displayed on a screen of a television system, and to systems and methods for providing contextually targeted content to television systems based on such video segment identification. As used herein, the term "television systems" includes, but is not limited to, televisions such as web TVs and connected TVs and equipment collocated with or incorporated in the television, such as a set-top box (STB), a DVD player or a digital video recorder (DVR). As used herein, the term "television signals" includes signals representing video and audio data which are broadcast together (with or without metadata) to provide the picture and sound components of a television program or commercial. As used herein, the term "metadata" means data about or relating to the video/audio data in television signals.

Recent advancements in fiber optic and digital transmission technology have enabled the television industry to increase channel capacity and provide some degree of interactive television service. This advancement is due in large part to the industry combining the processing power of a computer in the form of a set-top box (STB) and the large information-carrying capacity of cables. Such STBs have successfully been used by the television industry to provide both a greater selection of channels and some degree of interactivity.

The technology of interactive Television (ITV) has been developed in an attempt to allow a television (TV) set to serve as a two-way Information distribution mechanism. Features of an ITV accommodate a variety of marketing, entertainment, and educational capabilities such as allowing a user to order an advertised product or service, compete against contestants in a game show, and the like. Typically, the interactive functionality is controlled by an STB which executes an interactive program written for the TV broadcast. The interactive functionality is often displayed on the TVs screen and may include icons or menus to allow a user to make selections via the TV's remote control or a keyboard.

In accordance with one known technique, the interactive content can be incorporated into the broadcast stream (also referred to herein as the "channel/network feed"), in the present disclosure, the term "broadcast stream" refers to the broadcast signal (analog or digital) received by a television, regardless of the method of transmission of that signal, e.g., by antenna, satellite, cable, or any other method of analog or digital signal transmission. One known method of transparently incorporating interactive content into a broadcast steam is the insertion of triggers into the broadcast steam for a particular program. Program content in which such triggers have been inserted is sometimes referred to as enhanced program content or as an enhanced TV program or video signal. Triggers may be used to alert an STB that interactive content is available. The trigger may contain information about available content as well as the memory location of the content. A trigger may also contain user-perceptible text that is displayed on the screen, for example, at the bottom of the screen, which may prompt the user to perform some action or choose amongst a plurality of options.

Connected TVs are TVs that are connected to the Internet via the viewer's home network (wired or wireless), interactive web-type applications run on these TVs. There are several competing connected TV platforms. Yahoo is the most prominent one (see http://connectedtv.yahoo.com/). The basic common features of such connected TV platforms are: (1) a connection to the Internet; and (2) the ability to run software on top of the TV display. Several TVs with this support are already in the market (e.g., LG, Samsung and Vizio have models out). Many more may enter the market in the near future. Industry observers expect all new TVs to have these features within a few years.

Connected TVs can run an application platform such as the Yahoo widget engine. Flash Lite (see http://www.adobe.com/products/flashlite/), Google Android, or proprietary platforms. A developer community builds widgets to run on this platform. A widget is an element of a graphical user interface that displays an information arrangement changeable by the user, such as a window or text box. A widget engine is an operating system on which widgets run. As used herein, the term "widget" refers to code that runs on a widget engine. Each widget runs its own system process, so that one widget can be shutdown without affecting other widgets. The widget engine may include a feature called a "dock", which shows a respective icon for each available widget. TV widgets allow a television viewer to interact with the television, e.g., by requesting additional information relating to the subject matter being viewed, without switching the viewer's context from watching a television program to entering an application, in response to such a request, the requested information is displayed as part of the visual representation of the widget on the television screen.

Currently, virtually all TVs (connected or otherwise) do not have any metadata on what the viewer is watching.

While some information is available in bits and pieces in the content distribution pipeline, by the time a show reaches the screen, all information other than video and audio has been lost. In particular, the TV does not know what channel or show the viewer is watching, nor what the show is about. (The channel and show information a person sees on his/her screen is grafted on the STB from sometimes incomplete information.) This barrier is the result of the fundamental structure of the TV content distribution industry. This is a severe issue for interactive TVs since it limits their scope to strictly pull functionality.

There is a need for improvements in systems and methods for identifying what video segment is being viewed on a television. There is also a need for improvements in systems and methods of providing contextually targeted content to a connected television system.

SUMMARY

The present invention is directed to systems and methods for identifying which video segment is being displayed on a screen of a television system. In particular, the resulting data identifying the video segment being viewed can be used to extract a viewer's reaction (such as changing the channel) to a specific video segment (such as an advertisement) and reporting the extracted information as metrics.

In accordance with some embodiments, the video segment is identified by sampling a subset of the pixel data being displayed on the screen (or associated audio data) and then finding similar pixel (or audio) data in a content database. In accordance with other embodiments, the video segment is identified by extracting audio or image data associated with such video segment and then finding similar audio or image data in a content database. In accordance with alternative embodiments, the video segment is identified by processing the audio data associated with such video segment using known automated speech recognition techniques. In accordance with further alternative embodiments, the video segment is identified by processing metadata associated with such video segment.

The invention is further directed to systems and methods for providing contextually targeted content to an interactive television system. The contextual targeting is based on not only identification of the video segment being displayed, but also an extermination concerning the playing time or offset time of the particular portion of the video segment being currently displayed. The terms "playing time" and "offset time" will be used interchangeably herein and refer to a time which is offset from a fixed point in time, such as the starting time of a particular television program or commercial.

More specifically, the invention comprises technology that can detect what is playing on a connected TV, deduce the subject matter of what is being played, and interact with the viewer accordingly. In particular, the technology disclosed herein overcomes the limited ability of interactive TVs to strictly pull functionality from a server via the internet, thereby opening up business models such as: (1) applications that deepen viewers' engagement with shows being watched by providing additional content (director commentary, character biographies, etc.); (2) applications that provide "buy now" functionality based on specific content (product placement, "buy this song" functionality, etc.); and (3) applications that provide viewers access to web-style promotional features (games, contests, etc.).

In accordance with some embodiments, the video segment is identified and the offset time is determined by sampling a subset of the pixel data (or associated audio data) being displayed on the screen and then finding similar pixel (or audio) data in a content database. In accordance with other embodiments, the video segment is identified and the offset time is determined by extracting audio or image data associated with such video segment and then finding similar audio or image data in a content database. In accordance with alternative embodiments, the video segment is identified and the offset time is determined by processing the audio data associated with such video segment using known automated speech recognition techniques. In accordance with further alternative embodiments, the video segment is identified and the offset time is determined by processing metadata associated with such video segment.

As will be described in more detail below, the software for identifying video segments being viewed on a connected TV and, optionally, determining offset times can reside on the television system of which the connected TV is a component. In accordance with alternative embodiments, one part of the software for identifying video segments resides on the television system end another part resides on a server connected to the television system via the internet.

Other aspects of the invention are disclosed and claimed below.

BRIEF DESCRIPTION OF THE DRAWINGS

FIG. 5 is a drawing showing an exemplary pop-up window which appears when an associated field, displayed on the widget depicted in FIG. 4, is clicked on.

Reference will hereinafter be made to the drawings in which similar elements In different drawings bear the same reference numerals.

DETAILED DESCRIPTION OF THE INVENTION

Figure 1:
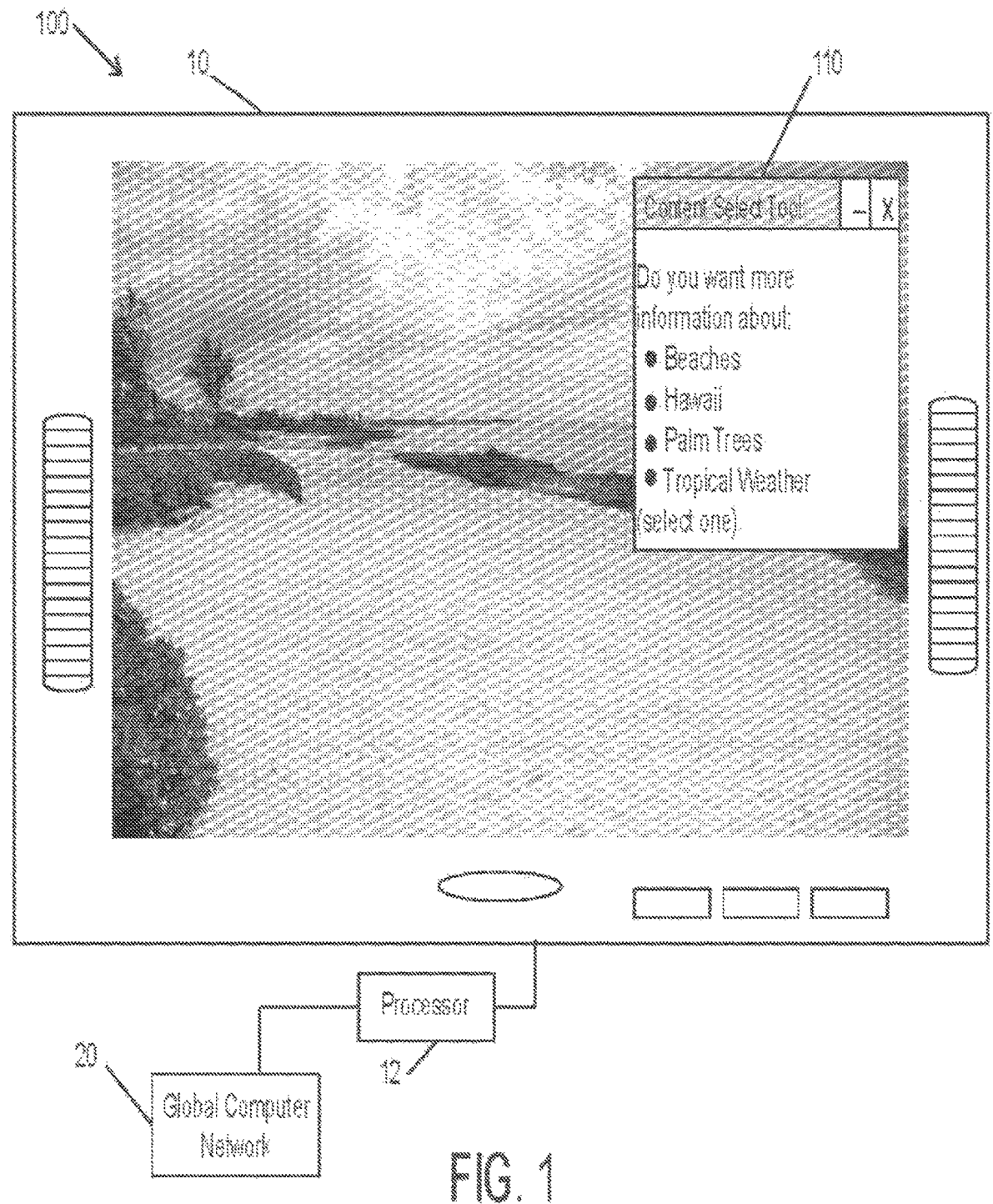
FIG. 1 is a schematic diagram of a connected television in accordance with one embodiment of the invention.

In accordance with a first embodiment of the invention shown in FIG. 1, a system 100 includes a connected television (TV) 10. The connected TV 10 is connected to a global computer network 20, typically through a processor 12. Although the processor 12 has been depicted as being external to the connected TV 10, the person skilled in the art will appreciate that the processor 12 can be located internal to the TV. As used herein, the term "global computer network" includes the internet. Although FIG. 1 does not show a source of television signals, it should be understood that the connected TV 10 receives a television signal that carries a program stream.

A content widget, which runs on the processor 12, includes computer software for identifying in real time which video segment is being displayed on the connected TV 10. Optionally, the content widget may further include computer software for determining what is the time offset from the starting time of the segment. The segment and offset together are referred to herein as the "location." In response to identifying the video segment being viewed and, optionally, determining the time offset, the widget presents the TV viewer with a widget in the form of pop-up window 110 that shows categories relating to the subjects most relevant to the video segment being viewed. From this window 110, the viewer can select one of the subjects and, based on the viewer's selection, the widget software running on the processor 12 will retrieve more information about the selected subject from the global computer network 20. This may be done, for example, by entering the selected subject into a search engine, an on-line encyclopedia or a custom search algorithm. This may also be done by entering the location into a custom algorithm that displays pre-scripted content based on show and location.

Content detection may be done in one of several ways. In one embodiment, the widget examines metadata provided with the program stream that sets forth the main subjects being discussed in the program stream. For example, the widget examines closed captioning data sent with the television signal. In another embodiment the widget employs speech recognition software and maintains a table that counts the number of times the detected words are used over a period of time. In yet another embodiment, the widget can employ audio signature detection or image recognition software to identify the displayed images in the program stream. In yet other embodiments the widget sends cues from the video or audio to a server where detection and contextual targeting is done (one embodiment of suitable video pixel cue processing software will be described in detail later with reference to FIG. 10.). The relevance of a subject can be determined in a number of ways.

In response to identifying the video segment being viewed and, optionally, determining the time offset, the TV widget retrieves additional information which is targeted as being relevant to the context of the subject matter of the video segment being viewed. The process of retrieving additional information or an advertisement which is targeted as being relevant to the context of the subject matter of the video segment being viewed will be referred to hereinafter as "contextual targeting." A contextual targeting TV widget will now be described with reference to FIGS. 2-5.

The contextual targeting TV widget is software that runs on top of the connected TV 10. This software extracts information sufficient to identify what the viewer is currently watching, and then, based on the extracted information, targets additional information on subjects that are likely to be of interest to the viewer. This additional information is displayed on the screen on top of the program being displayed on the TV screen. The additional information comes over the network (usually the Internet) from a feed or an Internet conglomeration fool (e.g., Wikipedia or Google). Some of this information is served to the user as free value added while some of it is paid for as advertisement or promotional deals.

To demonstrate the viewer experience provided by the systems disclosed herein, several scenarios will now be described.

Figure 2:
FIGS. 2-4 are drawings showing respective exemplary widgets which can be displayed on a connected TV in response to defection of a video segment that is related by subject matter.

In accordance with a first scenario depicted in FIG. 2, the system achieves a regular integration by picking up a keyword and targeting general information and ad words. In this first scenario, the viewer is watching a popular show such as Gossip Girl. At one juncture during viewing of that show, the characters are talking about going to the Hamptons for the summer. The contextual targeting TV widget detects the keyword "Hamptons". In response to detection of that keyword, the widget dock flashes or highlights the new keyword, as indicated by the light shading in FIG. 2. If the viewer has the widget dock open (i.e., they are interested in interacting with widgets), then the viewer can expand the widget. If not, the keyword is saved in case the viewer wants to see it later. The TV viewer can always scroll the last N keywords, where N is an integer, e.g., 50. When the viewer sees something he/she is interested in, the viewer clicks on highlighted keyword and the widget expands into a sidebar mode. The TV show continues to run in the background. The expanded widget, as seen in FIG. 2, now shows targeted information about the Hamptons, such as: (1) a short description on what the Hamptons are: "The Hamptons are a popular seaside resort. Parts of the Hamptons are a playground for the rich who own summer homes there; they also serve as a summer colony . . . "; and (2) a Google map of where the Hamptons are located. The expanded widget in this example may also show some news results about the Hamptons, such as: "Despite her rep's claim that a pesky paparazzo was to blame for Madonna's weekend fall from a horse in the Hamptons, the officers who responded to the scene . . . ". In response to the viewer clicking on other displayed fields, the expanded widget can also show targeted advertisements relating to, e.g., real estate in the Hamptons; travel to NYC; and vacation packages to other warm beach destinations where rich people congregate like they do in the Hamptons.

Figure 3:

In accordance with a second scenario depicted in FIG. 3, the system achieves a more complex integration by picking up a popular keyword and leveraging relationships with one-click retailers such as Amazon and promotional campaigns. In this second scenario, the viewer is watching a current events show such as Entertainment Tonight or the Daily Show. During the show, someone talks about something done by a public figure, for example, Britney Spears. The contextual targeting TV widget picks up the keywords "Britney Spears", in response to detection of those keywords, the widget dock flashes or highlights the new keywords, as indicated by the light shading in FIG. 3. If the viewer has the widget dock open, then the widget sidebar will show targeted information, such as: (1) a quick biography of Britney Spears: "Britney Jean Spears (born Dec. 2, 1981) is an American singer and entertainer. Spears is ranked as the eighth best-selling female recording artist in . . . "; (2) recent albums with "Buy Now" buttons: 1999: . . . Baby One More Time; 2000: Oops! . . . I Did It Again; 2001: Britney; 2003: In the Zone; 2007: Blackout; and 2008: Circus; (3) some news results about Britney Spears (taking into consideration the proximity of the earlier "Hamptons" keyword if applicable); (4) a link to images or You Tube search results for Britney Spears pictures or music videos; and (5) a promotional advertisement for Britney Spears' latest concert with an interactive calendar for shows in the viewer's geographical area and a "Buy Now" button. When the viewer clicks on a "Buy Now" button, a screen is opened to complete the transaction with as few steps as possible (e.g., using an Amazon ID/password combination). After the first time, a viewer can make a purchase without the need to re-enter his/her personal information.

Figure 4:
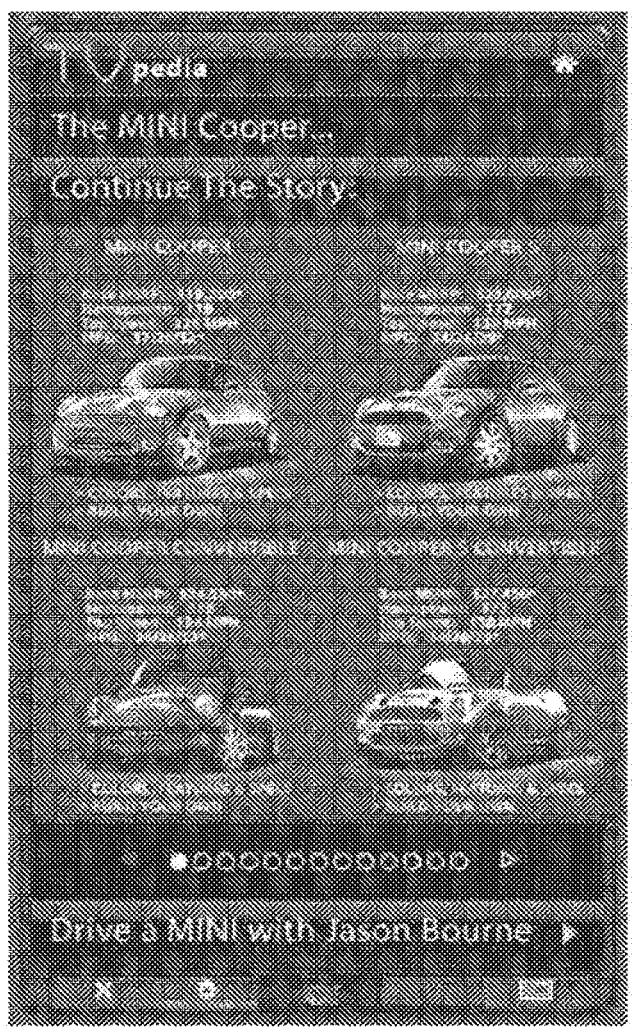
Figure 5:
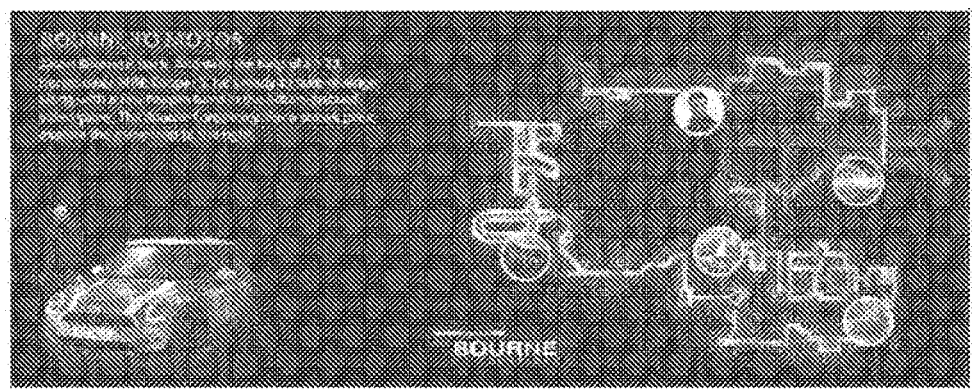

In accordance with a third scenario depicted in FIG. 4, the system achieves a customized integration by picking up keywords or specific video/audio segments purchased by specific partners for rich media promotional campaigns. In this third scenario, the viewer is watching an advertisement; for example, a car commercial in this example, the advertisement presents the viewer with a call to anion to activate their widget desk to "Continue The Story". The contextual targeting widget picks up the advertisement by a predefined marker or phrase and gives it preference over other events for a specified amount of time. The widget sidebar shows a micro-site that gives the user incentives to deepen the experience with the brand, such as: additional webasodes expanding characters or themes from the advertisement; additional information such as specs or feature comparisons; and interactive features such as games, sweepstakes or customization tools. For example, in response to the viewer clicking on the field "Drive a MINI with Jason Bourne", The Bourne Conspiracy-MINI microsite (shown in FIG. 5) is displayed.

In accordance with some embodiments, the video segment is identified and the offset time is determined by sampling a subset of the pixel data being displayed on the screen (of associated audio data) and then finding similar pixel (or audio) data in a content database. In accordance with other embodiments, the video segment is identified and the offset time is determined by extracting audio or image date associated with such video segment and then finding similar audio or image data in a content database. In accordance with alternative embodiments, the video segment is identified and the offset time is determined by processing the audio data associated with such video segment using known automated speech recognition techniques. In accordance with further alternative embodiments, the video segment is identified and the offset time is determined by processing metadata associated with such video segment.

In accordance with further embodiments, the offset time need not be determined and the system simply reacts to the presence of key words or phrases. For example, in accordance with one version of software that could run on the processor 12 seen in FIG. 1, there would be four basic software modules: (1) a metadata gathering module which gathers metadata on whatever is being viewed on the TV; (2) a subject/keyword extraction module which analyzes the gathered metadata and extracts what the program "is about"; (3) a contextual targeting of useful information module which gathers and presents additional information to the user based on the extracted subject/keywords extracted above; and (4) a contextual targeting of advertisements module which gathers and presents revenue-creating information to the user based on the extracted subject/keyword's extracted (this would include "buy now" buttons as well as keyword ads, and promotional campaigns).

There are many possible sources of metadata on what the viewer is watching including; (1) program information provided by the networks/stations or a third party (e.g., TV Guide); (2) closed captioning feeds; (3) an audio feed of the program being watched (run through speech recognition); (4) a video feed of the program being watched (run through image recognition); (5) additional channels riding on top of the audio or video feed of the program being watched; and (6) custom content manually attributed to specific programs and sections within a program.

In accordance with one specific embodiment the processor 12 gathers metadata from a combination of the audio feed of the program being watched and closed captioning information when available. The audio stream will be processed by a speech recognition engine for key-phrase extraction. A Dictionary and Language Model for the speech recognition algorithm will be carefully maintained to efficiently extract only those key words or phrases deemed to be worthy of targeting. For example, the dictionary will be weighted to look for proper nouns like "Britney Spears" or "The Yankees" and will be discouraged from recognizing adjectives like "green" or "hot". In the case of closed captioning data, the stream (this time a text stream) will be processed by a key-phrase/subject analysis engine.

Four possible setups for the metadata gathering components will now be described. In the embodiment shown in FIG. 6, the data processing needed for metadata gathering and for contextual targeting are performed on a centrally located server connected to a remotely located TV via a wide area network, e.g., the Internet. In the embodiment shown in FIG. 7, the data processing needed for metadata gathering is performed on the TV, while the data processing needed for contextual targeting is performed on a centrally located server connected to a remotely located TV via a wide area network. In the embodiment shown in FIG. 8, the data processing needed for contextual targeting is performed on a centrally located server connected to a remotely located TV via a wide area network, while the data processing needed for metadata gathering is performed on an offline server that is connected to the contextual targeting server by, e.g., a local area network. Note that in this embodiment the TV client 18 sends the Channel Recognition component 26 on the server cues to determine which program is being watched and therefore which metadata is applicable to this TV. Also note that while FIG. 8 shows using the audio stream as the input to the TV client 18, a video input is applicable in the same way. Alternatively, a hybrid solution, combining the foregoing approaches, is possible.

Referring to FIG. 8, a system 200 comprises a remotely located television 10 connected to a centrally located server 220 via a wide area network (not shown). The television 10 comprises a multi-pixel screen, a processor and a port for receiving television signals. The processor of the television is programmed with software comprising a widget platform or engine 14 and a TV client 18 that communicates with the server 220. Any one of a multiplicity of widgets 16 can be displayed on the TV screen by the widget engine. The server 220 has one or more processors and software including a speech recognition module 22 and a contextual targeting module 24. In this embodiment, the client 18 receives the audio stream of the television program or show being viewed, compresses that audio steam and then sends that compressed audio stream to the server 220. The information sent to the server 220 by the TV client 18 may also include a captioning stream (if available) or other metadata and/or channel information. The speech recognition module 22 processes that compressed audio stream to determine which channel is being watched.

Figure 6:
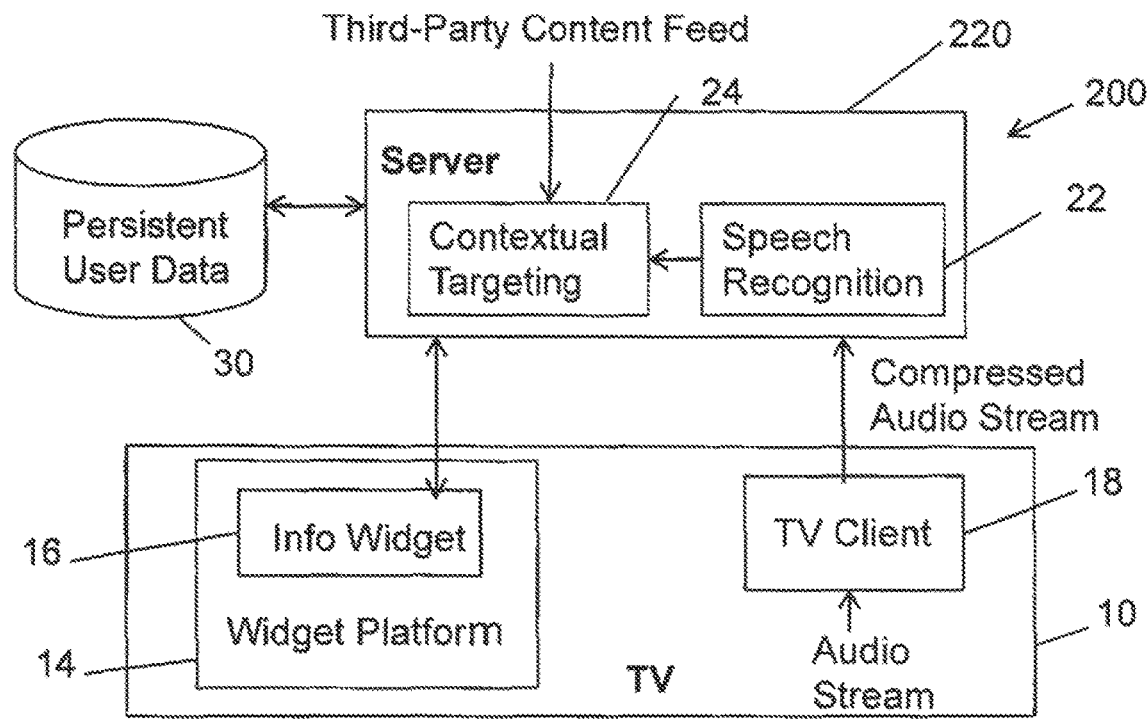
FIGS. 6-10 are block diagrams showing systems in accordance with further embodiments of the invention.

In the setup shown in FIG. 6, a lightweight client will be built for the TV operating system (usually Linux) which will capture the audio stream from the TV 10, compress the signal, and stream it over the network to the waiting server 220. This stream has a token attached to it so that the server can associate the stream with a particular user and/or TV. The server may then run a real-time speech recognition algorithm 22 on the stream, or a targeting search on the captioning data, and extract keywords/phrases. There are several suitable packages that perform speech recognition. One example is an open source package called Sphinx-4 (http://cmusphinx.sourceforge.net/sphinx4/), which is a speech recognizer written entirely in the Java™ programming language. These keywords/phrases will be attached to the user/TV in question and used by the contextual targeting module 24 to deliver content (e.g., content from a third-party content feed) to the widget 16. The server 220 stores user information, such as the TV ID, shows or programs viewed on that TV, and selections made using the widget 16 displayed on that TV, in a persistent user database 30.

Figure 7:
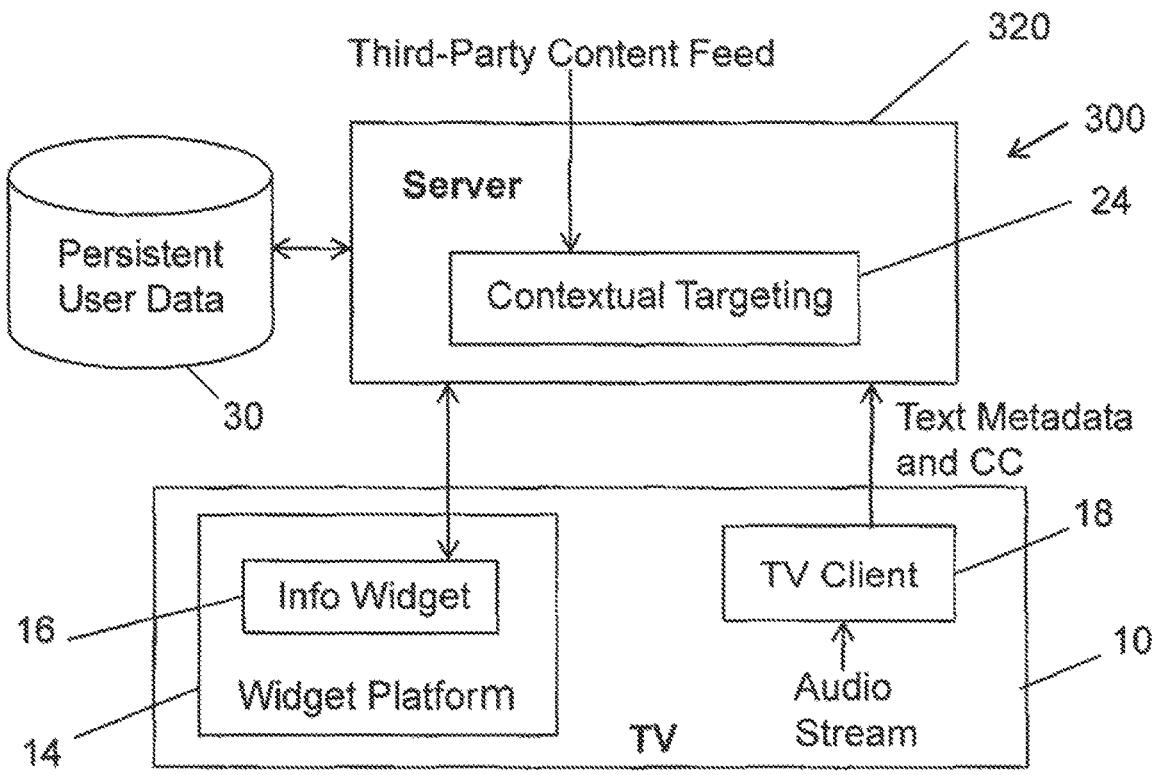
Figure 8:
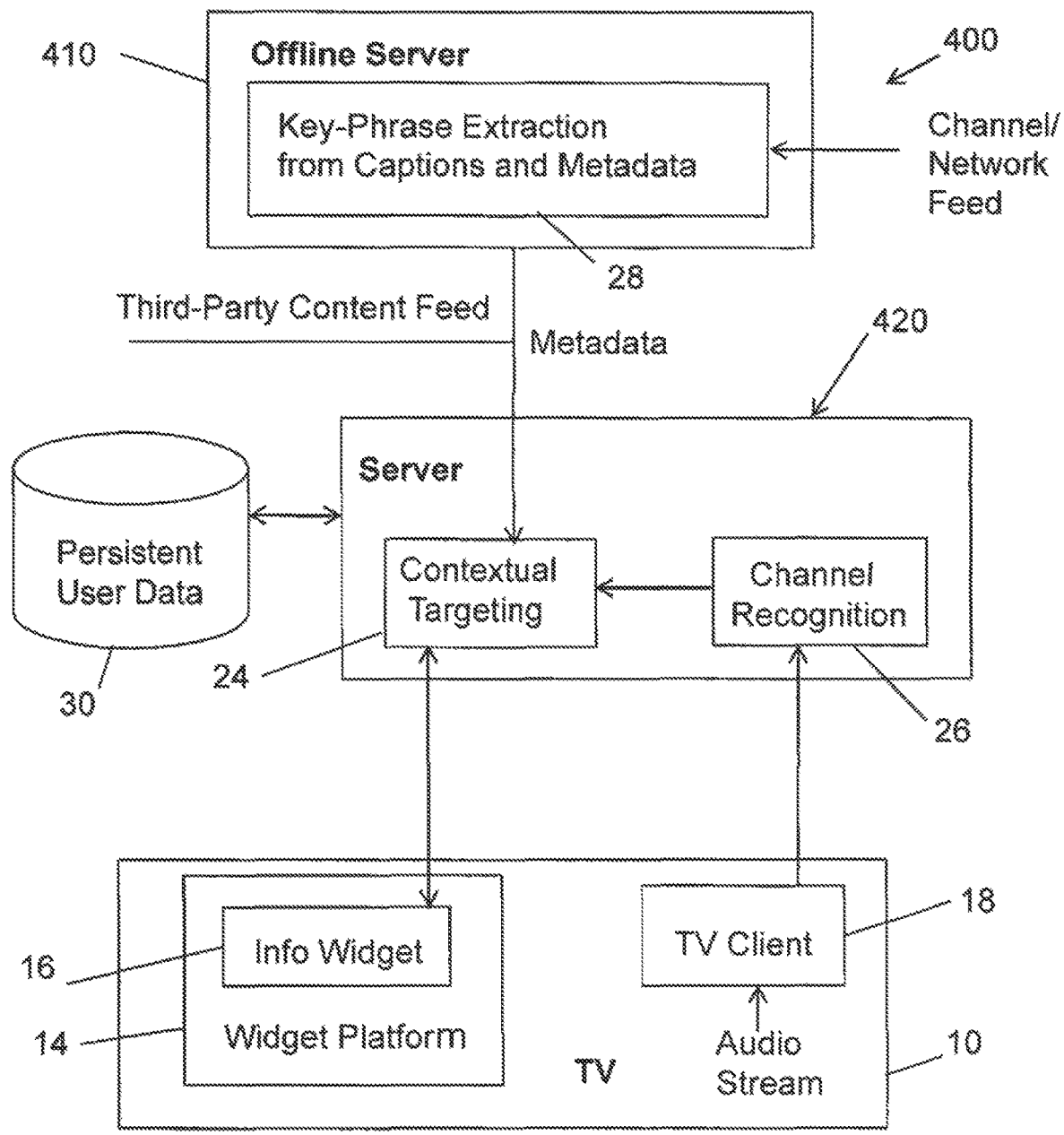

Referring now to FIG. 7, a system 300 comprises a remotely located television 10 connected to a centrally located server 320 via a wide area network (not shown). In this setup a heavier (yet still mostly lightweight) client 18 will be built for the TV operating system which will capture metadata (including captioning data) or if will capture the audio stream from the TV, run a more limited algorithm to determine relevant subjects, and send the server 320 only the keywords/phrases extracted. In one embodiment, a speech recognition client 18 would look to the server 320 to periodically update its Dictionary and Language Model. There are several packages that provide lightweight speech recognition for mobile and embedded devices (which the TV is similar to since it does not have a powerful CPU). A good example is the mobile version of the aforementioned open source Sphinx-4 package called PocketSphinx (http://cmusphinx.sourceforge.net/html/compare.php). The keywords/phrases will be attached to the user/TV in question and used by the contextual targeting module 24 to deliver content (e.g., content from a third-party content feed) to the widget 16. Again the server 320 stores user information, such as the TV ID, shows or programs viewed on that TV, and selections made using the widget 16 displayed on that TV, in a persistent user database 30.

Referring now to FIG. 8, a system 400 comprises a remotely located television 10 connected to a centrally located server 420 via a wide area network (not shown) and one or more offline servers 410 connected to the server 420 via a local area network (not shown). The server 420 has software comprising a contextual targeting module 24 and a channel recognition module 26. In the setup shown in FIG. 8, the offline servers 410 continually receive feeds corresponding to a set of TV channels, run a heavier more powerful algorithm, and tag each channel with metadata. A lightweight TV client 18 (part of the TV operating system) sends just enough information to the server 420 to enable the latter to identify the channel being viewed. FIG. 8 shows that the TV client receives the audio stream of the television program being viewed and then extracts audio data to be sent to the server 420, so that the latter can identify the channel being viewed by, e.g., detecting audio signatures. Alternatively, the TV client 18 may send pixel or audio cues (consisting of batches of pixel or audio data samples) to the server 420, and the server 420 may identify the channel being viewed by processing ambiguous pixel or audio cues using the technique disclosed in the Appendix hereto. For example, the TV client 18 may send pixel cues to the server 420, in which case the channel recognition module 26 would comprise suitable video pixel cue processing software of the type described later with reference to FIG. 10. In accordance with yet another alternative embodiment, the TV client 18 may receive the video stream and extract image data to be sent to the server 420, so that the channel recognition module 26 can identify the channel being viewed using image recognition software.

Based on the information received from the TV client, the server 420 can readily identify the video segment being viewed and the offset time from the start of the program. The online server 420 will match the channel the viewer is watching with one that is being tagged by the offline servers 410 and feed the contextual targeting module 24 with the appropriate keywords/phrases previously provided by the offline server. These keywords/phrases will be attached to the user/TV in question and used by the contextual targeting module 24 to deliver content (e.g., content from a third-party content feed) to the widget 16. The offline servers need not operate in real-time. Metadata (including the aforementioned keywords/phrases) can be loaded into the memory of server 420 by the offline servers periodically, e.g., hourly or daily. In addition, despite the feet that the offline server 410 is collecting a live network feed, viewers may be watching the same content delayed by several hours or even days. The online server 420 will match a channel and a respective time index into that channel for programs that are live as well as in the past. The offline server 410 and the channel recognition module 26 are configured to keep programs cues and metadata for a specified period of time (usually days or weeks).

Still referring to FIG. 8, another setup can be that in addition to (or instead of) the network feed to the offline server 410, a batch feed of programs is loaded into the offline server 410 at regular intervals. Since the offline server 410 keeps cues and metadata for a specified period of time, this setup forms a library of program cues and metadata that is particularly useful to viewers that are watching content on DVRs or DVDs. Note that programs may be loaded by a batch feed that are not available in the network feed.

In accordance with a further aspect of the invention, a hybrid solution is possible. One reasonable setup would have to be a hybrid solution mat would use each of the above approaches where they best fit. Since there are many possible TV configurations, no one solution will be ideal for all viewers. For those viewers where the channel/network data is available (for example, when a user is watching TV over the air or has downloaded/streamed the content from an On-Demand service) or where the audio feed can be recognized as a known channel, the offline computation approach (shown in FIG. 8) would be preferred. For those cases where bandwidth is not available to stream the audio, the speech recognition client on the TV (see FIG. 7) will be used to handle the most popular keywords. While for viewers watching DVDs or using a DVR, the streaming feed to the server (see FIG. 6) will provide better/deeper analysis. In cases where detection of a channel or a set of specific programs is preferable, only cues will be sent to be matched on the server (see FIG. 8). The system would decide which method to use in individual cases based on criteria such as: the success rates of the various methods; customer histories and value to advertisers; and available bandwidth or computational power.

Figure 9:
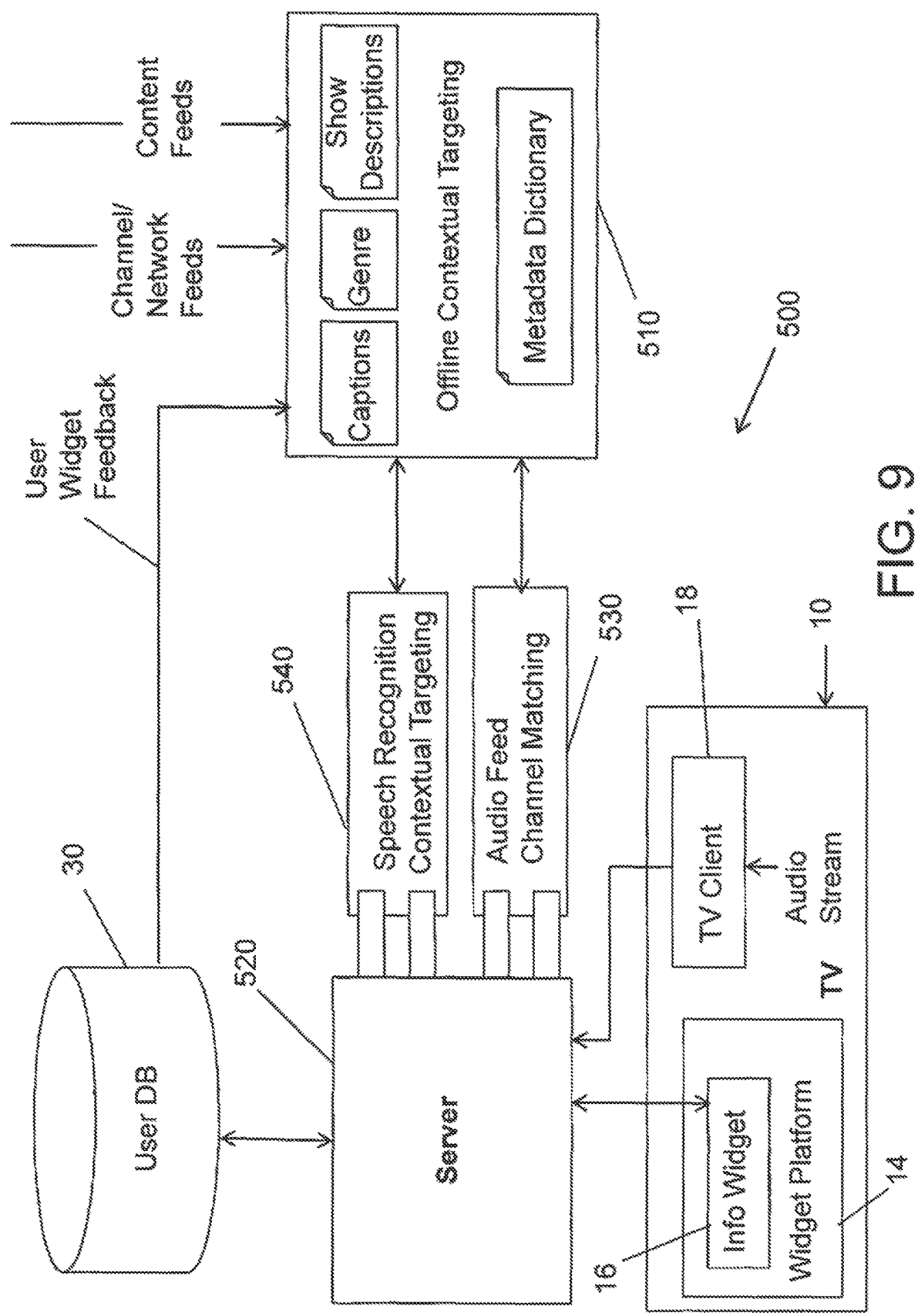

In accordance with yet another embodiment of the invention shown in FIG. 9, a system 600 comprises a server 520 that maintains a user-specific database 30 that communicates with an offline contextual targeting server 510. The offline contextual targeting server 510 receives input from the database 30 and from channel or network feeds and content feeds. It then provides information to the server 520, which communicates processed information based thereon to the connected television 10.

More specifically, the system 500 comprises a TV 10 having a widget platform 14 and a client 18; an offline server 510 on which a contextual targeting engine is running; a server 520 having an audio feed channel matching module 530 and a speech recognition contextual targeting engine 540; and a viewer database 30. The system 500 is programmed to figure out what the viewer is currently watching, which we is done using the audio stream that comes into the television 10. There are many possible TV setup possibilities and most of them "lose" the most valuable metadata sources like captions, channel information, and show descriptions. In particular, most cable box configurations connected to the TV via an HDMI cable are very poor in metadata. The audio and video feeds are the lowest common denominator and are prevalent in all setups. FIG. 9 shows the TV client 18 and the audio feed channel matching module 530 using the audio stream for detection of the channel being viewed by, e.g., detecting audio signatures.

Alternatively, the TV client 18 may send pixel cues (consisting of hatches of pixel data samples) to the server 520, and the channel matching module 530 may identify the channel being viewed by processing ambiguous pixel cues using the technique disclosed in the Appendix hereto. In the particular embodiment depicted in FIG. 9, the TV client module 18 is a lightweight client for the TV operating system which will capture the audio stream from the TV, compress the signal, and stream it over the global computer network (not shown in FIG. 9) to the server 520. This audio stream has a token attached to it so that the server 520 can associate the audio stream with a particular TV/viewer.

The server 520 receives the audio stream from the TV 10, associates it with a given TV/viewer, and sends the audio stream to either the audio feed channel matching module 530 or, if that fails, to the speech recognition contextual targeting engine 540 for tagging. Once tagged with targeted content, the server 54 then sends the targeted content back to the widget 16 on the TV 10.

The server 520 comprises an audio feed channel matching module 530 that tries to match the audio feed streamed from the TV 10 to a set of several hundred known live feeds of the most popular cable channels from around the country. If a viewer is watching a known channel, they are tagged with metadata gathered by the contextual targeting engine running on the offline server 510. Those that are not are processed by the speech recognition contextual targeting engine 540. It is not necessary to monitor every possible channel from the entire country since the speech recognition targeting engine 540 serves as a backup option. In addition, since this is a continuous process, channel changing is detected and in fact increases the pool of relevant tagging by adding subject/keywords from multiple channels.

The contextual targeting engine is software running on an offline server 510.

Alternatively, a plurality of offline servers can be utilized. The offline server 510 is hooked into live feeds of popular cable and network channels front around the country. These feeds can be configured to expose all of the useful metadata that is missing on the client televisions. In particular, closed captioning data, show descriptions, and channel genre power a contextual targeting engine that tags each channel with timely subject/keyword information. Since each channel has to be processed only once (instead of once per client TV), far more powerful algorithms can be run in real time. The metadata dictionary that is the product of this process is continuously refined by the actual responses of the viewers who use the widget. These responses are sent from the widget 16 to the server 520, stored in the user database 30, and sent to the offline server 510 as indicated by the arrow labeled "User Widget Feedback" in FIG. 9. Keywords that widget viewers internet with are given priority by the contextual targeting engine while those that are ignored are downgraded. The result is an ever more accurate metadata dictionary of what is currently on the TV 10.

As previously mentioned, the server 520 includes a speech recognition contextual targeting engine 540. For those viewers tuned to channels that are not recognized, playing DVDs, or using DVRs, a real-time speech recognition solution is used to extract the subject/keywords. Since speech recognition systems can only use limited dictionaries, what makes this solution practical is the fact the contextual targeting engine running on the offline server 510 is already maintaining a concise dictionary of subject/keywords that are currently prevalent in television programs and known to engage widget viewers. This system would he particularly effective for viewers using DVRs since the material playing was likely recorded in the recent past (in many cases only delayed by several hours) and was therefore already tagged in the offline process and its metadata refined by feedback from the widget. Still referring to the embodiment shown in FIG. 9, the widget 16 on the television 10 leverages the targeting done by all the other components described above and is the only part of the system that the viewer actually sees. Unlike normal Konfabulator widgets which must be periodically updated with a new look-and-feel, the contextual targeting widget 16 changes its presentation at any given time depending on the content that is being targeted.

A preferred embodiment of the present invention will now be disclosed. Although the system to be disclosed includes a connected TV having a widget engine and client software (for generating, e.g., pixel cue points) resident therein, it is within the scope of the invention to place that widget engine and client software on collocated equipment such as an STB, a DVR or a DVD player that provides television signals to the connected TV. Also, although the system to be disclosed samples end then processes pixel values, the values sampled and processed could, in the alternative, be audio values or metadata such as closed captioning.

Figure 10:
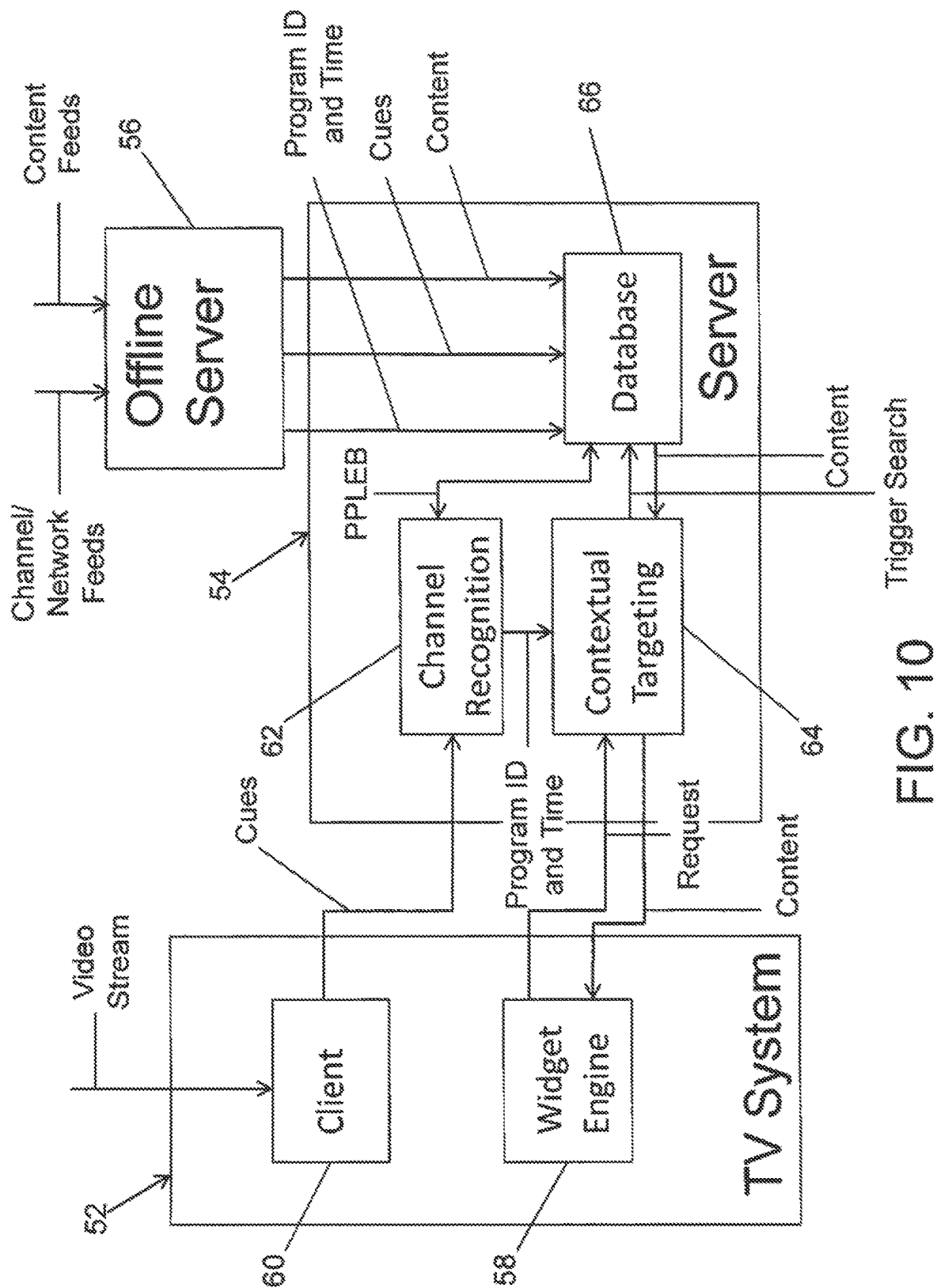
Figure 11:
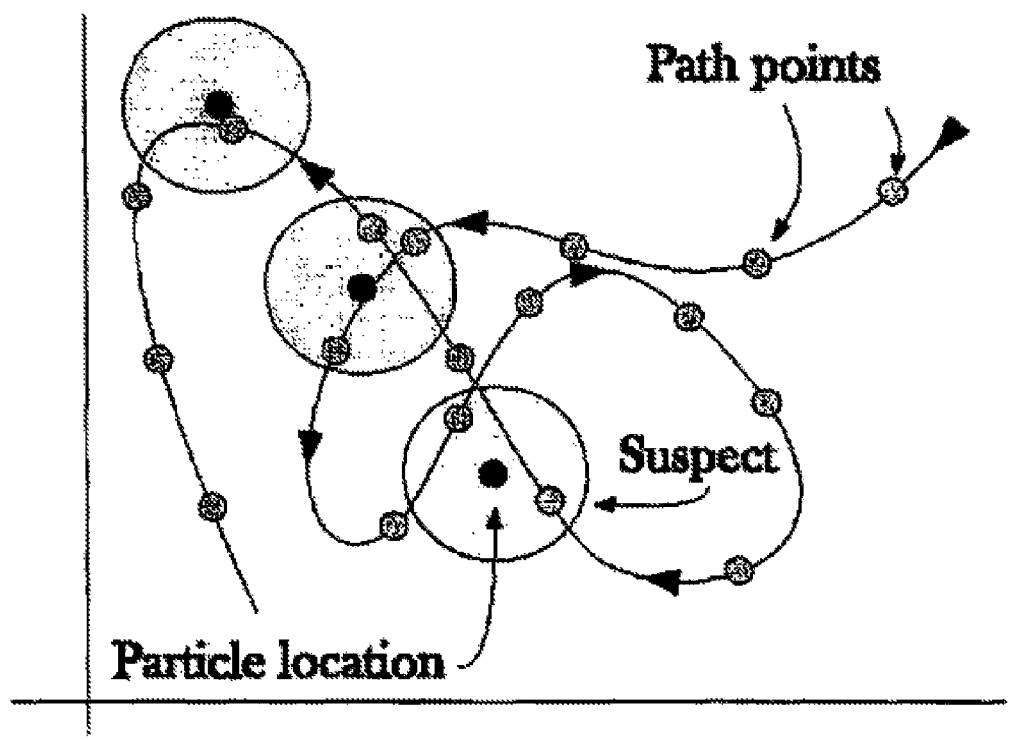
FIGS. 11 through 16 are graphs referenced in the Appendix, in which an algorithm for tracking video transmission using ambiguous cues is disclosed.
Figure 12:
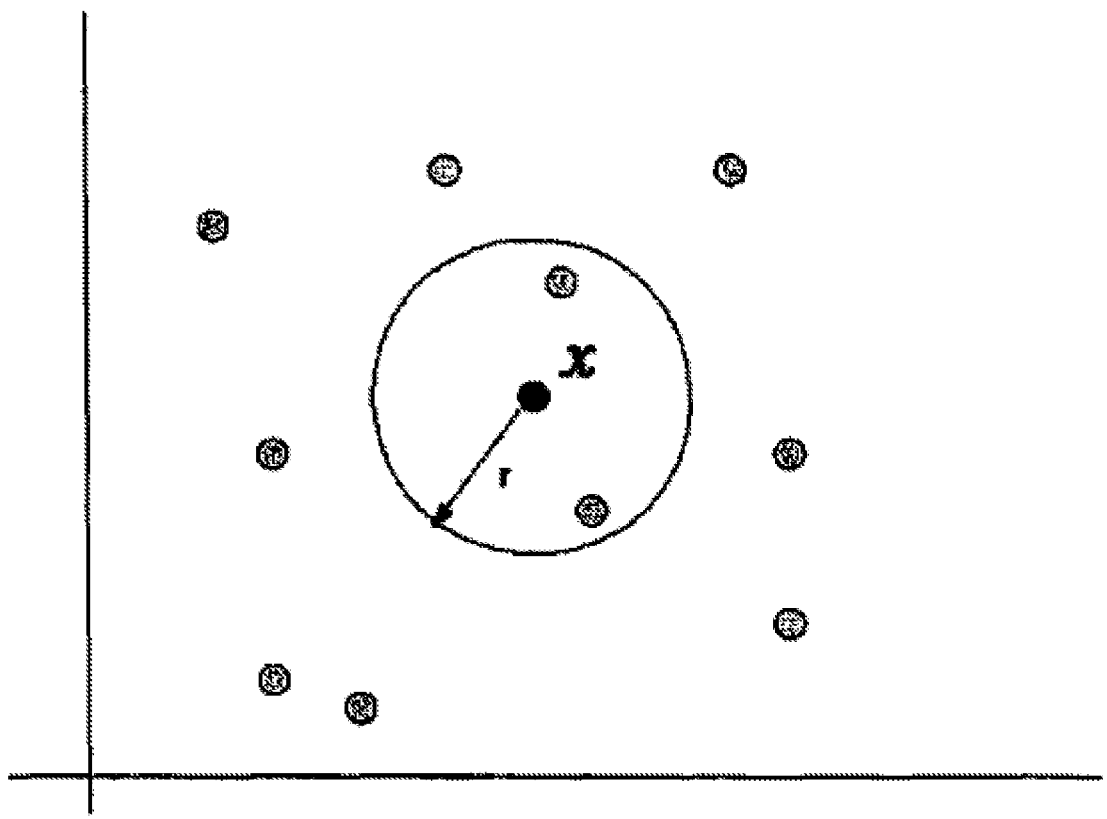
Figure 13:
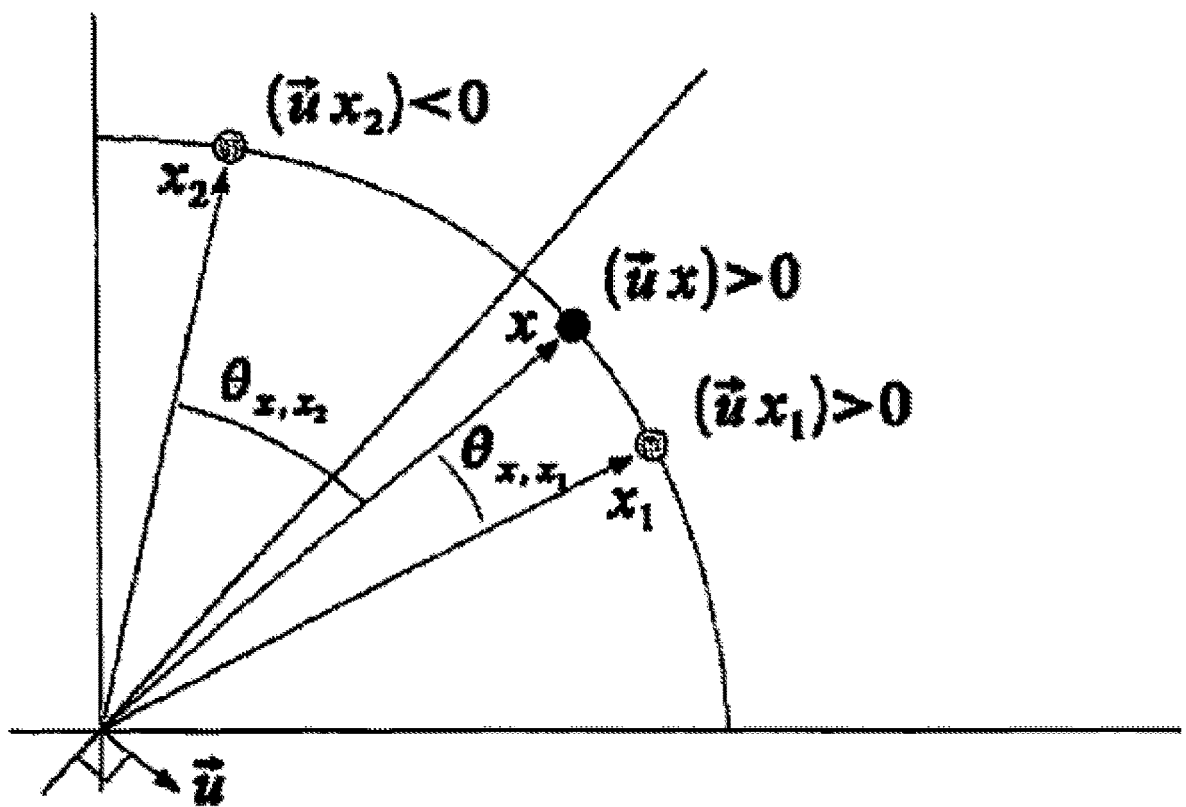
Figure 14:
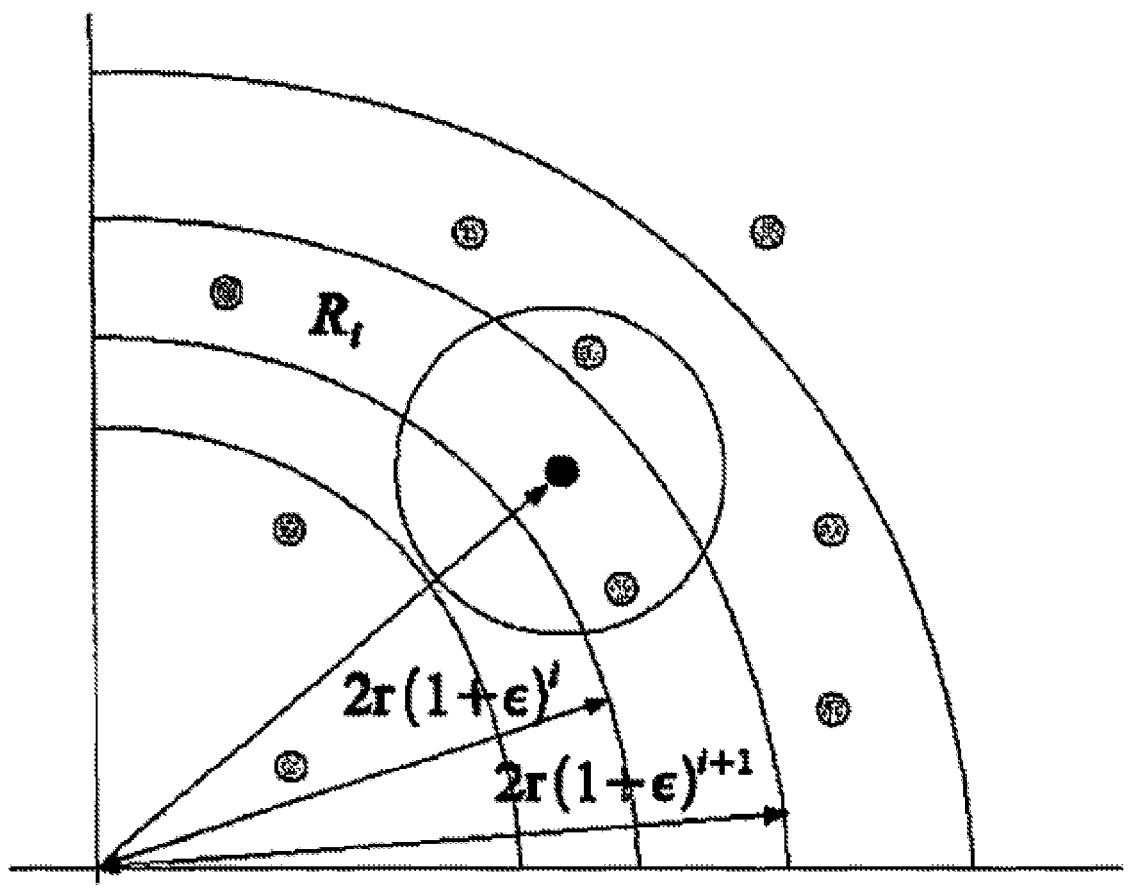
Figure 15:
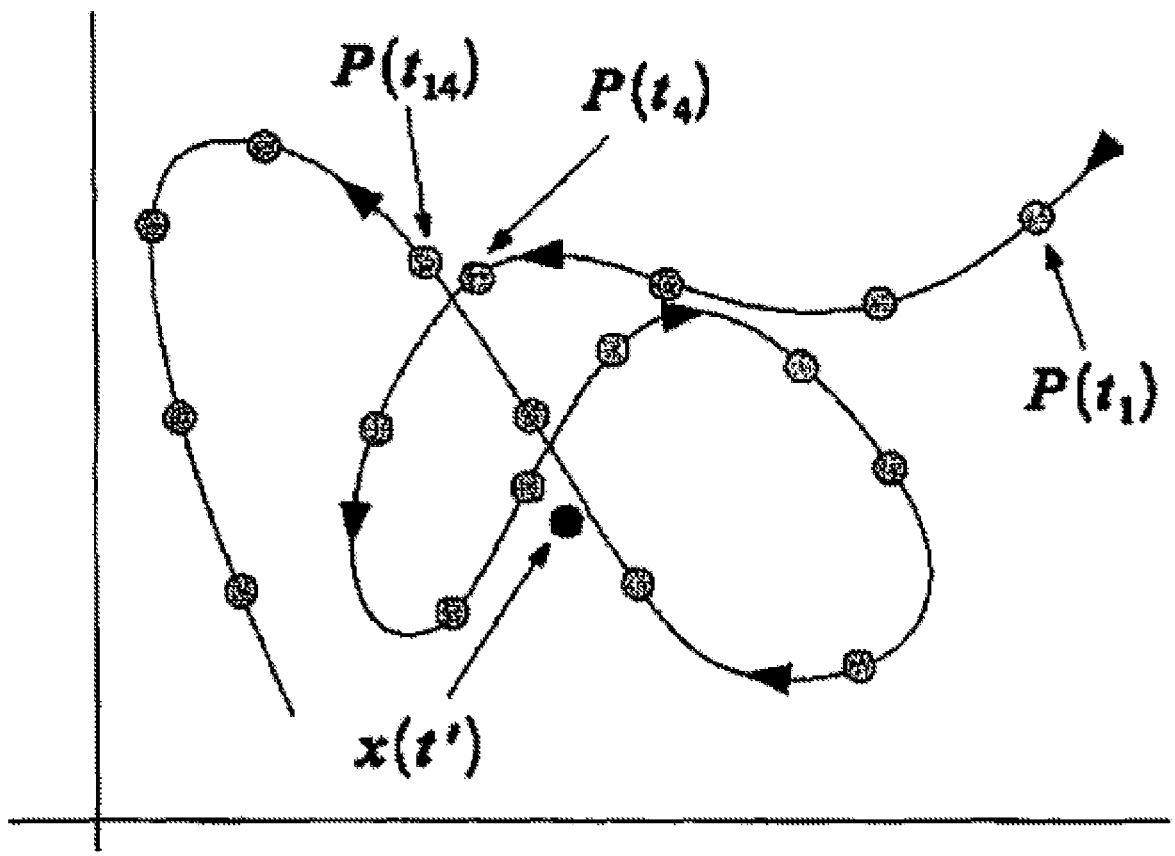
Figure 16:
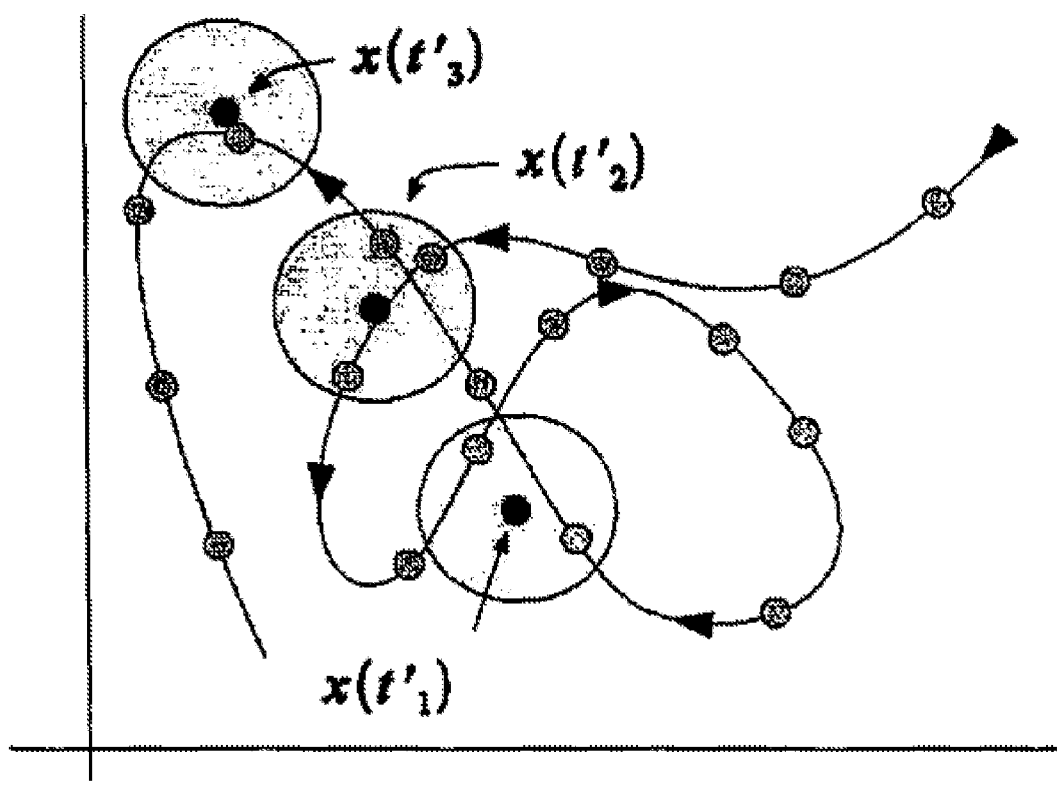

The main components of a system in accordance with the preferred embodiment shown in FIG. 10 include a television system 52 and a first server 54 which communicate via a network, e.g., the Internet. In addition, the system comprises a second server (hereinafter referred to as an "offline server") 56 that communicates with the first server 54 via a network, preferably a local area network (LAN).

FIG. 10 shows the functional components of interest of the television system 52, first server 54 and offline server 56. The television system 52 comprises a television having a multi-pixel screen (not shown in FIG. 10) and at least one other component (also not shown) that provides television signals to the television. For example, such other television component may comprise a STB, a DVR or a DVD player. The television system 52 further comprises a processor (not shown in FIG. 10). That processor may be incorporated in either the television or in the at least one other component of the television system.

Still referring to FIG. 10, the processor of the television system is programmed with software comprising a widget engine 58 and a client 60. Consistent with the previous statement regarding the location of the television system process, the widget engine and client software may reside on either the television or on the at least one other component of the television system. Furthermore, it should be appreciated that, in the alternative, the widget engine and the client software could run on separate processors included in the television system 52.

In either case, the client module 60 is programmed to sample pixel data and generate an HTTP request addressed to server 54 based on the sampled pixel data. That HTTP request comprises a time stamp and a plurality of strings of RGB (or hex) values, the latter being referred to herein as "a pixel cue point". Each pixel cue point comprises a respective subset of the RGB (or hex) values making up a respective "frame" of the video segment being displayed on the television screen, as will be explained in greater detail below. [In reality, digital video does not have frames. The system disclosed herein samples at a time rate, e.g., samples every amount of time T.]

At this juncture, it should be further noted that server 54 comprises a processor and memory, neither of which are indicated in FIG. 10). However, FIG. 10 does indicate that the server 54 has at least the following software components: a channel recognition module 62, a contextual targeting module 84 and a database 86 which comprises a library of indexed content. The channel recognition and contextual targeting modules run on the server process. The library data itself needs to be stored in a persistent yet readily available format that can be quickly searched. The simplest way to do this is to load the library into a data structure in the server memory. Another option is to store most of the library on a disk.

The channel recognition module 62 comprises a points management submodule and a user management submodule (not shown in FIG. 10). The points management submodule searches the database 66 in two ways: (1) a search of the entire library for a given set of points, returning all the suspects that are close to a match; and (2) a search for a given set of points and a given suspected location, returning whether the user is indeed where the currently stored data indicates. [A "user" is a unique TV or other device identified by a globally unique ID.]

The user management submodule keeps the user's session and uses the results from the points management submodule to match a location (in the viewed video segment) to a specific user. It also keeps configurations and tolerances used to determine when and how a match is made. The user management submodule also includes a session manager. The user management submodule matches the user's location based on an HTTP request received from the TV client module 60. If the user ID already has session data, the HTTP request is routed to the user management submodule attached to this session (session persistence). The user management submodule looks at the user's history and decides what kind of search request (if any) to make to the points management submodule. If the user's location is a suspect, the points management submodule will be called to do a brute force search around that location. If the user's location is not known, the points management submodule will be called to do a probabilistic global search. The user management submodule saves the updated location in the user's session.

As indicated by the arrow labeled "CUES" in FIG. 10, the client module 60 sends the user management submodule of the channel recognition module 62 a regular update with pixel cue information. This communication is done via the aforementioned HTTP request and the pixel cue information is sent over GET parameters.

The following is an example of one such HTTP request:
http://SERVER NAME/index?token=TV_ID&time=5799&cueData=8-1-0, 7-0-0, 170-158-51, 134-21-16, 3-0-6, 210-210-212, 255-253-251, 3-2-0, 255-255-244, 13-0-0, 182-30-25, 106-106-40, 198-110-103, |28-5-0, 3-0-2, 100-79-2, 147-31-41, 3-0-6, 209-209-209, 175-29-19, 0-0-0, 252-249-237, 167-168-165, 176-25-17, 113-113-24, 171-27-32, |38-7-0, 2-2-2, 99-70-0, 116-21-31, 6-0-9, 210-210-210, 179-31-22, 31-31-33, 162-65-64, 10-10-10, 184-33-25, 105-108-32, 169-28-28, |104-86-15, 4-4-4, 46-18-0, 178-112-116, 0-0-1, 213-213-213, 178-31-22, 211-211-211, 164-62-72, 0-0-0, 183-32-24, 150-149-42, 153-27-19, |188-192-43, 2-1-6, 67-49-0, 156-92-95, 3-1-2, 215-215-215, 177-28-19, 226-233-53, 249-247-247, 207-211-21, 182-31-23, 136-153-47, 152-25-18, |192-118-109, 176-181-84, 201-201-201, 218-172-162, 201-200-39, 226-226-226, 244-244-244, 221-214-212, 166-165-170, 209-209-209, 191-26-36, 154-28-20, 150-21-15, |0-3-0, 0-0-0, 156-27-22, 161-28-19, 192-192-26, 157-26-22, 174-29-23, 149-23-18, 190-34-25, 156-27-20, 176-27-18, 0-0-0, 184-30-25, |159-29-19, 9-3-0, 161-26-22, 137-22-15, 0-4-9, 167-26-26, 159-28-25, 165-27-24, 65-21-13, 154-22-19, 99-24-11, 153-24-20, 185-34-28, |153-26-21, 0-0-0, 165-25-15, 141-24-13, 1-1-1, 165-25-17, 154-27-24, 182-32-26, 180-31-25, 149-25-17, 155-21-19, 36-12-4, 171-29-22, |153-26-21, 0-0-0, 165-25-15, 141-24-13, 1-1-1, 165-25-17, 154-27-24, 182-32-26, 180-31-25, 149-25-17, 155-21-19, 36-12-4, 171-29-22, |

The parameters contained in this HTTP request are as follows:

The parameter "token" is a unique Identifier for the TV (or other device). Each TV has a globally unique ID assigned by the manufacturer. This ID is sent to the user management submodule of the channel recognition module 62 shown in FIG. 10.

The parameter "time" is an arbitrary time stamp used to keep requests in order and to aid in the calculation of "the most likely location" described below. This parameter is usually provided by the TV's internal clock.

The parameter "cueData" is a list of RGB values, e.g., samples of pixel values composed of RGB combinations. The format is R1-G1-B1,R2-G2-G2 . . . |R3-G3-B3,R4-G4-B4, . . . |etc., where each RX-GX-BX indicates a respective RGB Location, RGB Location1, RGB Location2, RGB Location3, etc. form a sample, Sample1|Sample2|Sample3"etc. form the HTTP request. [In the claims appended hereto, these samples are referred to as "pixel cue points".] The term "RGB Location" should be construed broadly enough to encompass the set of RGB values for an individual pixel identified by its X and Y coordinates, as well as a set of RGB values which is a function of the RGB values for a plurality of individual pixels in an array (e.g., a square array). In the latter case, the collection of Individual sets of RGB values for all of the pixels in the array is referred to as "PatchData". The array of pixels will be located in a given area (e.g., a square area) on the television screen.

In the foregoing example, the cueData parameter of the HTTP request has 10 samples, one sample per video frame, each sample consisting of the RGB values for 13 pixels or 13 pixel arrays, the same pixels or pixel arrays being acquired for each of the ten frames. However, the number of pixel values for each frame, the location of pixels sampled, and the number of samples in the HTTP request can be varied in accordance with point sampling instructions received by the TV client component.

In accordance with the embodiment depicted in FIG. 10, the television system 52 has a system level function that extracts the pixel information. This function wakes up periodically, e.g., every 0.1 second, and extracts pixel data from N patches for each "frame" of pixel data, where N is a positive integer (e.g., 13). The pixel data from each patch is reduced to a single pixel sample, i.e., a single set of RGB values, which single pixel sample is a function of the pixel data in a respective patch. That function may be averaging, weighted averaging or any other suitable function. The pixel samples for a succession of "frames" (e.g., 10) are accumulated and then sent to the server. For example, the TV client sends a hatch of pixel samples to the server periodically, e.g., every 1.0 second.

An exemplary API specification file (written in the C computer language) is presented below. This API is part of the TV client module 60, which software runs on a chip set incorporated in the television system. The specific functions defined in the following API specification are implemented by that chip set.

```
/*
 *TVCaptureAPI.h
 *
 */
#ifndef TVCAPTUREAPI_H
#define TVCAPTUREAPI_H
    /**
    * A class holding a single pixel
    * The pixel can be saved either as an RGB combination or as the
    hex value,
    *
    */
    typedef struct pixel {
        int red;
        int green;
        int blue;
        long hexValue;
    Pixel;
    * A class representing a rectangular patch of the video plane
    * The rectangle is defined by its top left and bottom right corners
    */
    typedef struct patch {
        int topLeftX, topLeftY;
        int bottomRightX, bottomRightY;
    Patch
    * A class holding a snapshot in time of the pixel data for a patch
    * pixelData is an array of pixels starting from the top left corner
and going down row by row
    * numOfPixels is clearly just for convenience since it is derived
from the left and right corners
    */
    typedef struct patchData {
        int topLeftX, topLeftY;
        int bottomRightX, bottomRightY;
        int numOfPixels;
        Pixel* pixelData;
    PatchData;
    *Returns an array of PatchData objects for the requested patches
    * Each patchData contains a snapshot of the pixel data for that
patch on the video plane at that moment.
    *
        *@param: requestedPatches       an array of patches for which
you want to get back data.
        *@return:                        an array of data corresponding
to the requested patches.
    */
    PatchData* getPatchesFromVideo(Patch *requestedPatches, int
    numOfPatches);
    /**
        *Cleans up the patchData created by getPatchesFromVideo
        *You MUST call a cleanup every time you call
        getPatchesFromVideo
        * @param: o                      the pointer to the PatchData
that was returned by getPatchesFromVideo
        * @param: numofPatches           the number of patches
    */
    void freePatchData(PatchData* o, int numOfPatches);
    /**
        *Returns the dimension of a patch covering the entire video
plane (i.e. , a fancy way of saying the dimensions of the video). Note
that this may not be just the screen size depending on where in the
pipeline the video is captured since video can be stretched to fit etc.
        * @param ret                    a pointer to the return object.
This will get populated with a patch object whose top left corner is 0, 0
and whose bottom left corner is the bottom left of the video
        * @return                       0 if success. -1 if failed.
    */
    int getVideoDimensions(Patch *ret);
    /**
        *Returns a unique ID for this device. This will be used to share
metadata extracted for this TV with any equipped widget running on
the TV.
        * @param: buff                   the return string buffer.
        * @param: max len                the maximum length of the ID
        *
        *@return:                        the number of characters in the
                                         ID if successful.
        *If the ID had to get truncated, a negative value of the actual
number of characters is returned.
        */
    int getTVID{char* buff, int max len};
#endif/* TVCAPTUREAPI_H_*/
```

The API file includes declarations of three data structures of interest: "Patch", "PatchData" and "Pixel". The pixels in the television screen are arranged in an X, Y plane, each pixel being identified by its X and Y coordinates, A "Pixel" is composed of three integers (e.g., RGB values), [Alternatively, the declarations can be populated by hex values.] A "Patch" is the coordinates of a square on the TV screen, each square including an array of pixels. The term "PatchData" is a collection of "Pixels" in a given square on the screen. One note on syntax; in the C language, the term "Pixel*" means a collection of "Pixel", So the line "Pixel* pixalData;" means a collection of "Pixel" arbitrarily named "pixelData". The function:

PatchData* getPatchesFromVideo(Patch "requestedPatches, int numOf Patches);

is implemented by a chip set inside the television system and means the function "getPatchesFromVideo" returns a collection of "PatchData".

Referring again to FIG. 10, in accordance with a preferred embodiment the TV client module 60 is programmed to acquire the RGB values for each pixel included in each array (i.e., Patch). The collection of RGB values for each pixel array or Patch are then processed to generate a respective set of RGB values for each pixel array or Patch. In other words, in the case of a 3×3 pixel array, the collection of nine sets of RGB values is reduced to a single set of RGB values. Many different mathematical functions can be utilized to perform this operation, e.g., averaging or weighted averaging. The HTTP request sent by the TV client 60 to the channel recognition module 62 in the server 54 will include a single set of RGB values (i.e., three integers) for each Patch and will not include all of the PatchData for each Patch.

The TV client module 60 is an embedded piece of code that gets "baked" onto a chip of the TV or other device and sends the captured points to the user management submodule of the channel recognition module 62. The TV client module can be updated in the field with firmware updates. In accordance with one embodiment, the TV client module 60 requests instructions from the server 54 periodically to determine the number of points to sample, the frequency, the locations, etc. The TV client module need not send the server points at the same rate that it samples them. In accordance with one embodiment, the TV client module samples about 10 times per second and batches up the resulting points, sending them to the server every second or so. The TV client module needs to know which component of the user management sub-module has its sessions. During initialization (and periodically thereafter), the TV client module calls the user management session manager to get an address of a user management component. The user management component assigned to a given TV or other device keeps that user's session information. In cases where the assigned user management component is not available (e.g., if it crashed), the session manager assigns a new user management component. The TV client module also needs an arbitrary time stamp to keep its requests in order and give positioning information to the associated component of the points management submodule.

In response to receipt of the HTTP request from the client module 10, the channel recognition module 62 identifies in real time what video segment the cueData in the HTTP request is taken from and in what time offset from the starting time of the segment. As previously mentioned, the segment and offset together are referred to as the "location". The points management submodule of the channel recognition module 62 uses a path pursuit algorithm that searches the database 66 for those pixel cue points stored in the database which are nearest to the pixel cue points received in the HTTP request. This is accomplished in the manner which is described in detail in the Appendix entitled "The Path Pursuit Problem: Tracking Video Transmission Using Ambiguous Cues," the entire contents of which are incorporated by reference herein. The double-headed arrow labeled PPLEB in FIG. 10 indicates that the points management submodule of the channel recognition module communicates with the database 16 while performing the path pursuit algorithm, which comprises an algorithm named Probabilistic Point Location in Equal Balls (PPLEB) and an efficient likelihood update algorithm. The Appendix explains the methodology for identifying the most likely "location" in detail, including mathematical equations. The following more succinct explanation of the search methodology is also provided.

The path pursuit algorithm disclosed in the Appendix uses a mathematical construct called locality sensitive hashing. In the prior art, it was known to map each point in a data set to a word, which is a list of its hash values. These words were placed in a sorted dictionary (much like a common English dictionary). When a point was searched, the algorithm first constructed its word and then returned its closest lexicographical match in the dictionary. This required computing each letter in the word separately and performing a dictionary search. In the version disclosed in the Appendix, fixed length words (depending only on the norm of the point vector) are constructed and then the points management submodule of the channel recognition module looks in the dictionary only for exact word matches. This has two advantages. First, computing the word corresponding to a point can be done in batch, more efficiently than letter by letter. Second, the dictionary search is made faster and simpler using traditional hash functions instead of a dictionary.

It should be appreciated that the search for the location (i.e., video segment plus time offset) seeks the most likely suspects. The path pursuit algorithm first finds the suspect locations and then computes a probability distribution for those suspects. More specifically, each suspect location is assigned a probability indicating the likelihood that it matches the video segment being displayed on the television screen. If the probability for suspect locations having the greatest probability exceeds a preset threshold, then the decision is made that the suspect location corresponds to the video segment being displayed. Otherwise the path pursuit algorithm continues to update the list of suspect locations and their probability distribution as successive received pixel cue data points are processed.

The path pursuit algorithm is a probabilistic approach: an exact matching of pixel cue points at all times is not needed. Instead the decision that the result is true is made based on the aggregated evidence. The algorithm tracks in real time all of the time and is able to handle intermittent pixel cue points in a sequence that deviate from the other pixel data points in that sequence. For example, the algorithm may only recognize 7 out of 10 frames of a video segment, but is still able to identify the most likely location. The algorithm also responds quickly to the television viewer pausing, changing channels, etc.

Upon receipt of a first pixel cue point from the television system, the server computes a probability distribution for all suspect locations. Upon the receipt of each subsequent pixel cue point from the same television system, the list of suspect locations is updated and an updated probability distribution is computed for those updated suspect locations. This iterative process continues in real time at all times, allowing the viewing habits of the user to be closely monitored. Each pixel cue point received from the television is discarded after it has been processed. The history of the suspect locations and their probability distributions is retained in memory for each user session. However, if a particular suspect location becomes less likely (e.g., has a probability below a preset lower threshold), then that suspect location can be ignored, i.e., deleted from the stored history.

It should be further noted that it would be inefficient to search the entire pixel cue library for every television system. To increase search efficiency, the pixel cue data in the database is divided into sections. The search for nearest neighbors is conducted in only one section. Further details concerning this aspect can be found in the Appendix.

Once the most likely location in the database is identified, content stored in the database in association with that location can be retrieved by the contextual targeting module 64 (see FIG. 10). In accordance with the preferred embodiment, by the contextual targeting module 64 receives the program ID and the time offset of the most likely suspect location (i.e., the suspect location having the greatest probability provided that probability exceeds a threshold for success which is presettable) from the channel recognition module 62 and then uses that information to retrieve the associated enhanced content from the database 66. The database contains closed captioning for the video segments whose identifiers and pixel cue points are stored therein. The database also contains an encyclopedia of content consisting of triggers (i.e., single words or short sequences of words and proper nouns that refer to specific subjects relatively unambiguously) extracted from documents and respective content associated with each trigger. The encyclopedia is an index of structured content data, preferably organized by categories. The contextual targeting module comprises a search engine that searches the closed captions (stored in the database) associated with the identified location and then identifies any triggers in the relevant closed captioning. This is indicated in FIG. 10 by the arrow labeled "Trigger Search". The contextual targeting module then retrieves the content associated with those identified triggers from the encyclopedia in the database. Trigger sets as well as search configurations are customized to specific items of content (i.e., specific television shows, commercials, or movies). For example, basketball games are identified as such and the contextual targeting module uses a trigger set comprising names of players/coaches etc. In another example, news and current events shows are configured to use a trigger set that emphasizes politicians' names and current event buzzwords (i.e., "healthcare"). In another example, drama shows and sitcoms are configured to use a trigger set that is composed of arbitrary combinations of words and timestamps meant to trigger events on a given location in the plot without relevance to the subject of the dialog (e.g., an event corresponding to a song which starts playing after a specific point in the plot).

The database 66 is constructed by the offline server 56 (see FIG. 10) which receives channel/network feeds and content feeds. The database is constantly updated as the feeds are received by the offline server.

In accordance with the preferred embodiment, the offline server 56 extracts time stamps, pixel cue points and closed captioning from the channel/network feeds. That extracted information is stored as part of the database 66. More specifically, the database contains the following information for each television program, commercial or other broadcast or video segment: (a) a list of pixel cue points for each video segment; (b) offsets from some fixed point in time, which offsets are respectively associated with the aforementioned pixel cue points, thereby indicating the sequence in time when those pixel cue points occur; and (3) associated metadata (e.g., closed captioning). Preferably the offline server samples the pixel data at the same rate as does the client of the television system. However, it is not necessary that the two machines, when sampling the same video segment, sample at precisely the instances in time.

The offline server 56 also extracts triggers and content from the content feeds. That extracted information, when stored in memory, form the aforementioned encyclopedia which is also part of the database 16. The offline server can also create a customized index to a particular television program.

The offline server 56 may have resident thereon a master source module which indexes content and adds it to the library (i.e., database 66) that the points management submodule searches over. The components of this module are collections of emulators very similar to the TV client components except that they are able to run in Master mode. This mode sends points to the points management submodule is the same way as the standard mode but with metadata attached and with instructions to the points management submodule to add these points to the library instead of searching on them. The master source module operates in any of four modes: (1) Batch; (2) Live; (3) Channel; and (4) UGC. In the Batch mode, content arrives as complete video files well in advance of the "air date." The TV client emulator plays the video files in Master mode, which sends the points to the points management submodule to be added to the library. In the Live mode, a specific live event is set up to be indexed (e.g., a basketball game). A stream is arranged ahead of time to be used to index this content and attached to one of the emulators running in the Master mode. In the Channel mode, an emulator is set up to continuously view and index a given channel. The content comes over the public distribution networks, usually through an STB. A server with a capture card is set up to get the content from the STB and run the emulator. Access to an electronic program guide is also necessary to identify the shows being indexed. In the UGC mode, the TV client module on a given TV or other device can act in the Master mode to add content to the library that the device is currently watching. The master source module also contains a simple database where basic content metadata (name, channel, etc.) are tagged to a unique content ID. This database just lists the content being indexed.

Referring again to FIG. 10, the contextual targeting module 64 is a user-facing application software that targets contents from a pre-defined repository on the closed captions stream for the current piece of content being watched. This module relies on the user management and points management submodules and the master source module to operate since its ability to retrieve the relevant closed captioning information is clearly dependent on correct content detection.

More specifically, the contextual targeting module 64 sends retrieved content to the particular widget running on the widget engine 58 of the television system 52 in response to a request from that widget. More specifically, the widget running on the TVs widget engine (or any other GUI on the TV) sends the server 54 a request for show information, metadata, and contextual targeted content on a regular basis. The specifics of the request depends on the specific functionality required by the TV application software. The following are some examples of responses from the server.

The first response is an example response from the server for a request for contextually targeted content based on closed captions:

```
{"createdOn": "Sun Nov 11:38:40 2009",
"token": "TV ID",
"channel": "The Colbert Report Tue May 19 2009", "channelTime";
"34951",
"myContent": {
  {
    "searchKey": "Walter Kirn",
    "displayName": "Walter Kirn",
    "matchFactor": 3.2706767671099999e-06,
    "foundIn": "THEN MY GUEST WALTER KIRN SAY
    "engineName": "triggerSearch",
    "rank": 3.2706767671099999e-06,
    "matchedText": "waiter kirn"
  }
  {
    "searchKey": "Sammy Hagar",
    "displayName": "Sammy Hagar",
    "matchFactor": 3.6402208460499996e-05,
    "foundIn": "SCOFFLAW SINCE SAMMY HAGAR
    "engineName": triggerSearch",
    "rank": 3.6402208460499996e-05,
    "matchedText": "sammy hagar"
  }
  {
    "searchKey": "Republican_Party_%28United_States%29",
    "displayName": "Republican Party (United States) ",
    "matchFactor": 0.0001940746083739999,
    "foundIn": "REPUBLICANS HAVE FOUND A WAY TO
    "engineName": "triggerSearch",
    "rank": 0.0001940746083739999,
    "matchedText": "republicans"
  }
}
```

The parameters contained in this first exemplary response to the HTTP request are as follows:

The parameter "createdOn" is a timestamp of the date/time the user session was created. This parameter is used for keeping track of how long the user is watching TV.

The parameter "token" is the same unique identifier for the TV previously described herein. This ID is used to tie the Channel Recognition component with the Contextual Targeting component.

The parameter "channel" identifies the program being watched by name and broadcast date.

The parameter "channelTime" is the playing time (in milliseconds) into the piece of recognized content. The terms "playing time" and "offset time" are used interchangeably herein and are intended to have the same meaning.

The parameter "myContent" is a list of content targeted for this location in the show based on closed captions. Three exemplary content items have been included under this parameter. The parameters for each content item are as follows: "searchKey" is a unique identifier for the particular content item; "displayName" is a title for the particular content item; "foundIn" is the line of closed captioning that matched the particular content item; "engineName" is the internal search engine used (a selected one of a plurality of search engines with different algorithms, optimized for different kinds of shows, can be utilized); and "matchedText" is the specific text in the closed caption stream that triggered the search engine match for the particular content item.

What follows is an exemplary response from the server for a request for contextually targeted content from a custom index for a specific show:

```
{
  "widget": "CNN",
  "myContent": [
    {
      "searchKey":"/2008/07/08/the-us-christian-military/",
      "byLine": "Randi Kaye - AC360 Correspondent",
      "displayName": "The U.S. Christian military?",
      "startTime": 290000,
      "images": [
    "/assests/art_soldiers_pray.jpg"
      ],
      "engineName": "AC360timeSearch",
      "abstract": "Is the United States Military becoming a Chrisitian organization? That's what one U.S. soldier tells us. I met Army Specialist Jeremy Hall in Kansas City a few weeks ago. He's based at Fort Riley, in Junction City, ... this isn't happening?",
      "endTime": 100000000,
      "publishDate": "7/8/2009"
    }
    {
      "searchKey": "/2009/11/10/armygains-with-muslim-soldiers-may-be-lost/",
      "byLine": "Mark Thompson - Time",
      "displayName": "Army gains with Muslim soldiers may be lost",
      "startTime": 290000,
      "image": [
    "fort.hood.shootings/story.memorial.mon.gi.jpg"
      ],
      "engineName": "AC360timeSearch",
      "abstract": "Less than 1% of America's 1.4 million troops are Muslim - and that number is only the military's best guess, since just 4,000 troops have declared ... may be impossible. Hasan is in intensive care at a San Antonio hospital, breathing without a respirator. But given his mental state, even he may not know what caused him to kill.",
      "endTime": 100000000,
      "publishDate": "11/10/2009"
    }
    {
      "searchKey": "/2009/11/09/murderhas-no-religion/",
      "byLine": "Arsaian Iftikhar - AC360 Contributor",
      "displayName": "Murder has no religion",
      "startTime": 115000,
      "images": [
    "/art.prayer.02.cnn.jpg"
      ],
      "engineName": "AC360timeSearch",
      "abstract": "Most of the world's 1.57 billion Muslims know that the Holy Quran states quite clearly that, \ "Anyone who kills a human being ... it shall be as though ... act of mass murder no more makes their criminal act \ "Islamic than a Christian uttering the \"Hail Mary\" while murdering an abortion medical provider, or someone chanting \"Onward, Christian Soldiers\" while bombing a gay nightclub, would make thier act \"Christian\" in nature.",
      "endTime": 100000000,
      "publishDate": "11/9/2009"
    }
```

The parameters contained in this second exemplary response to the HTTP request are as follows:

The parameter "widget" is the ID of the custom application software using this data source.

The parameter "myContent" is a list of content targeted for this location in the show based on closed captions and other metadata.

The parameter "searchKey" is a unique identifier for this content.

The parameters "startTime" and "endTime" limit a particular content item to specific areas of the show.

The parameter "engineName" is the internal search engine used (in this case it is a CNN specific search engine that uses an index composed of Anderson Cooper blog entries).

The parameters "byline", "images", "abstract" and "publishDate" are content for display to the user.

In accordance with one method for providing contextually targeted content to the television system 52 of the system shown in FIG. 10, the server 54 performs the following stops: (a) storing a respective data set for each of a multiplicity of video segments, each data set comprising data identifying a respective video segment, data points extracted from television signals for the respective video segment, and associated offset time data indicating the respective sequence in time of the data points extracted from the television signals for the respective video segment; (b) receiving data points from the television system 52 during display of a video segment on the screen; (c) retrieving from the database identifying data and offset time data associated with the data points that best matches the received data points, wherein the identifying data and the offset time data, in combination, identify which portion of the video segment is being displayed on the screen; (d) retrieving from the database content associated with the identified portion of the video segment being displayed on the screen when a threshold likelihood of successful identification is attained or exceeded; and (e) sending the retrieved content to the television system 52.

In accordance with the embodiment depicted in FIG. 10, the database 66 stores pixel cue points and content for a multiplicity of video segments, while the server 54 is programmed to perform the following steps: (a) determining which pixel cue points stored in the database are possible matches to pixel cue points received from a television system 52 via a network; (b) computing a probability distribution for the pixel cue points determined in step (a); (c) retrieving from the database a program identifier and a playing time associated with the pixel cue points determined to have a greatest probability of matching the pixel cue points received from the television system; (d) retrieving from the database content associated with the program identifier and the playing time retrieved in step (c); and (e) sending the content to the television system via the network.

Further, in accordance with a further aspect of the embodiment depicted in FIG. 10, television system 52 comprises a multi-pixel screen and a processor system, the processor system comprising a widget engine and a separate client programmed to generate a request comprising pixel cue points, each pixel cue point comprising a set of pixel values displayed in a predetermined set of pixels of the screen at a respective time, the predetermined set of pixels being a subset of the total number of pixels of the screen.

In accordance with yet another aspect of the embodiment depicted in FIG. 10, the system comprises a network, a server 54 connected to the network, and a television system 52 connected to the network. The television system 52 comprises a multi-pixel screen and a processor system, the processor system in turn comprising a widget engine and a client programmed to send a request addressed to the server and comprising pixel cue points. The server 54 comprises a database 66 for storing pixel cue points and content for a multiplicity of video segments, and a processor system programmed to perform the following steps: (a) determining which pixel cue points stored in the database 66 are possible matches to the pixel cue points received from the television system 52 via the network; (b) computing a probability distribution for the pixel cue points determined in step (a);

(c) retrieving from the database 66 a program identifier and a playing time associated with the pixel cue points determined to have a greatest probability of matching the pixel cue points received from the television system 52 via the network; (d) retrieving from the database 66 content associated with the program identifier and the playing time retrieved in step (c); and (e) sending the content to the television system 52 via the network.

In accordance with another method for automatically processing pixel values of a video segment displayed on the multi-pixel screen of television system 52 of the system shown in FIG. 10, the server 54 performs the following steps: (a) storing a respective data set for each of a multiplicity of video segments, each data set composing data identifying a respective video segment and pixel cue points extracted from the respective video segment, and each pixel cue point comprising a respective subset of a respective set of pixel values making up a respective frame of the respective video segment; (b) receiving pixel cue points from the television system 52 during display of a video segment on the multi-pixel screen; (c) determining which pixel cue points in the database are possible matches to the received pixel cue points; (d) computing a probability distribution for the pixel cue points determined in step (c); and (e) retrieving from the database 66 identifying data associated with the pixel cue points determined to have a greatest probability of matching the received pixel cue points, wherein the identifying data identifies the video segment being displayed on the multi-pixel screen of the television system 52.

To carry out the method described in the preceding paragraph, the server 54 may further comprise a metrics software module (not shown in FIG. 10) that collects matching information from the user management module and saves that matching information in the database 66 for later report generation. The purpose of the metrics module is to not only provide useful data on how the system is operating, but also to create added-value reports that can be sold to businesses that require knowledge of viewer viewing habits. In accordance with one embodiment, the metrics data is sent to an aggregator/sink so that it can be cached and dumped to the database asynchronously. The raw metrics data is saved in the database. That raw metrics data is then processed for inclusion in various reports, such reports on the number of users who watch a given show, the number of users who watch a given show in time shift (e.g., on a DVR), and the number of users who watch a given commercial.

While the invention has been described with reference to various embodiments. It will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "a processor system" should be construed broadly to encompass either a single processor or more than one processor. Also, the designation of method steps using alphabetic symbols should not be construed to require that those method steps be performed in alphabetical order.

What is claimed is:

1. A computer-implemented method comprising:
generating a media cue representing one or more frames of a first media segment displayed by a display device, wherein the first media segment is an unknown media segment, wherein the media cue includes a sample of pixel data of the one or more frames;
determining an identification of the first media segment based on the media cue;
presenting a secondary window over a portion of the first media segment;
identifying one or more words from an audio component of the first media segment;
identifying a second media segment using the one or more words from the audio component, wherein the second media segment is contextually relevant to the one or more words, wherein the second media segment is identified in response to detecting the one or more words;
expanding a size of the secondary window in response to identifying the secondary media segment; and
displaying, within the secondary window of the display device, the second media segment, wherein the secondary window is positioned over at least a portion of the first media segment, and wherein the first media segment continues while the secondary window is display displayed over the first media segment.

2. The computer-implemented method of claim 1, wherein generating the media cue includes:
identifying one or more keywords associated with the first media segment, wherein the first media segment is identified based on the one or more keywords.

3. The computer-implemented method of claim 1, wherein generating the media cue includes:
sampling a subset of pixel data from the one or more frames of the first media segment, wherein determining the identification of the first media segment is based on the sampled subset of pixel data.

4. The computer-implemented method of claim 1, wherein generating the media cue includes:
sampling an audio channel of the one or more frames of the first media segment, wherein determining the identification of the first media segment is based on the sampled audio channel.

5. The computer-implemented method of claim 1, further comprising:
determining an offset time interval indicative of a position of the one or more frames relative to a first frame of the first media segment, wherein identifying the second media segment is further based on the offset time interval.

6. The computer-implemented method of claim 1, wherein the second media segment includes at least one of a video related to the first media segment, a feature comparison related to the first media segment, or interactive features related to the first media segment.

7. The computer-implemented method of claim 1, further comprising:
receiving input selecting a portion of the second media segment;
retrieving a third media segment based on the received input; and
displaying within the secondary window, the third media segment.

8. A computing device comprising:
one or more processors; and
a non-transitory machine-readable storage medium containing instructions which when executed by the one or more processors, cause the one or more processors to perform operations including:
generating a media cue representing one or more frames of a first media segment displayed by a display device, wherein the first media segment is an unknown media segment, wherein the media cue includes a sample of pixel data of the one or more frames;
determining an identification of the first media segment based on the media cue;
presenting a secondary window over a portion of the first media segment;
identifying one or more words from an audio component of the first media segment;
identifying a second media segment using the one or more words from the audio component, wherein the second media segment is contextually relevant to the one or more words, wherein the second media segment is identified in response to detecting the one or more words;
expanding a size of the secondary window in response to identifying the secondary media segment; and
displaying, within the secondary window of the display device, the second media segment, wherein the secondary window is positioned over at least a portion of the first media segment, and wherein the first media segment continues while the secondary window is display displayed over the first media segment.

9. The computing device of claim 8, wherein generating the media cue includes:
identifying one or more keywords associated with the first media segment, wherein the first media segment is identified based on the one or more keywords.

10. The computing device of claim 8, wherein generating the media cue includes:
sampling a subset of pixel data from the one or more frames of the first media segment, wherein determining the identification of the first media segment is based on the sampled subset of pixel data.

11. The computing device of claim 8, wherein generating the media cue includes:
sampling an audio channel of the one or more frames of the first media segment, wherein determining the identification of the first media segment is based on the sampled audio channel.

12. The computing device of claim 8, wherein the operations further include:
determining an offset time interval indicative of a position of the one or more frames relative to a first frame of the first media segment, wherein identifying the second media segment is further based on the offset time interval.

13. The computing device of claim 8, wherein the second media segment includes at least one of a video related to the first media segment, a feature comparison related to the first media segment, or interactive features related to the first media segment.

14. The computing device of claim 8, wherein the operations further include:
receiving input selecting a portion of the second media segment;
retrieving a third media segment based on the received input; and
displaying within the secondary window, the third media segment.

15. A non-transitory machine-readable storage medium containing instructions which when executed by one or more processors, cause the one or more processors to perform operations including:
generating a media cue representing one or more frames of a first media segment displayed by a display device, wherein the first media segment is an unknown media segment, wherein the media cue includes a sample of pixel data of the one or more frames;
determining an identification of the first media segment based on the media cue;
presenting a secondary window over a portion of the first media segment;
identifying one or more words from an audio component of the first media segment;
identifying a second media segment using the one or more words from the audio component, wherein the second media segment is contextually relevant to the one or more words, wherein the second media segment is identified in response to detecting the one or more words;
expanding a size of the secondary window in response to identifying the secondary media segment; and
displaying, within the secondary window of the display device, the second media segment, wherein the secondary window is positioned over at least a portion of the first media segment, and wherein the first media segment continues while the secondary window is display displayed over the first media segment.

16. The non-transitory machine-readable storage medium of claim 15, wherein generating the media cue includes:
identifying one or more keywords associated with the first media segment, wherein the first media segment is identified based on the one or more keywords.

17. The non-transitory machine-readable storage medium of claim 15, wherein generating the media cue includes:
sampling a subset of pixel data from the one or more frames of the first media segment, wherein determining the identification of the first media segment is based on the sampled subset of pixel data.

18. The non-transitory machine-readable storage medium of claim 15, wherein generating the media cue includes:
sampling an audio channel of the one or more frames of the first media segment, wherein determining the identification of the first media segment is based on the sampled audio channel.

19. The non-transitory machine-readable storage medium of claim 15, wherein the operations further include:
determining an offset time interval indicative of a position of the one or more frames relative to a first frame of the first media segment, wherein identifying the second media segment is further based on the offset time interval.

20. The non-transitory machine-readable storage medium of claim 15, wherein the second media segment includes at least one of a video related to the first media segment, a feature comparison related to the first media segment, or interactive features related to the first media segment.

* * * * *